US012169407B2

(12) United States Patent
Sneyders et al.

(10) Patent No.: US 12,169,407 B2
(45) Date of Patent: Dec. 17, 2024

(54) POWER PLATFORM WITH FOUR WHEEL STEERING/REAR WHEEL STEERING

(71) Applicant: Raven Industries, Inc., Sioux Falls, SD (US)

(72) Inventors: Yuri Sneyders, Zemst (BE); Jeffrey Allen Van Roekel, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 37 days.

(21) Appl. No.: 17/466,568

(22) Filed: Sep. 3, 2021

(65) Prior Publication Data

US 2022/0066453 A1 Mar. 3, 2022

Related U.S. Application Data

(60) Provisional application No. 63/074,217, filed on Sep. 3, 2020.

(51) Int. Cl.
G05D 1/00 (2024.01)
B62D 6/00 (2006.01)

(52) U.S. Cl.
CPC .......... *G05D 1/0212* (2013.01); *B62D 6/002* (2013.01)

(58) Field of Classification Search
CPC .......... G05D 1/101; G05D 2201/0201; G05D 1/0212; B62D 6/002
See application file for complete search history.

(56) References Cited

U.S. PATENT DOCUMENTS 7,835,832 B2 11/2010 Macdonald et al.
10,207,735 B2 2/2019 Bebernes et al.
(Continued)

FOREIGN PATENT DOCUMENTS

WO WO-2005101945 A2 * 11/2005 ........... A01B 51/026

OTHER PUBLICATIONS

"International Application Serial No. PCT/US2021/049071, International Search Report mailed Dec. 8, 2021", 2 pgs.
(Continued)

*Primary Examiner* — Jason Holloway
*Assistant Examiner* — Christopher A Buksa
(74) *Attorney, Agent, or Firm* — Schwegman Lundberg & Woessner, P.A.

(57) ABSTRACT

A device for steering an agricultural machine having independently steerable axles includes first and second steerable axle interface to couple with a first steering mechanism of a first steerable axle and a second a second steering mechanism of a second steerable axle. The device includes a planning module having a guidance path for the agricultural machine, and a steering control module to coordinate steering of the steering mechanisms. The steering control module includes a translational comparator to determine a translational difference between a location of the agricultural machine relative to the guidance path, an angular comparator to determine an angular difference between an angular orientation of the agricultural machine relative to the guidance path, and a translation steering controller to actuate the first and second steering mechanisms according to the translational difference. The device includes an angular steering controller to actuate the second steering mechanism according to the angular difference.

19 Claims, 16 Drawing Sheets

(56) References Cited

U.S. PATENT DOCUMENTS

| | | | |
|---|---|---|---|
| 10,524,407 | B2 | 1/2020 | Schleicher et al. |
| 10,766,526 | B2 | 9/2020 | Bebernes et al. |
| 11,584,431 | B2 * | 2/2023 | Nakata .................. B60T 8/172 |
| 2003/0105563 | A1 | 6/2003 | Oshima et al. |
| 2006/0025894 | A1 * | 2/2006 | O'Connor .............. G01S 19/14 |
| | | | 701/1 |
| 2012/0035798 | A1 | 2/2012 | Barfoot et al. |
| 2019/0000007 | A1 | 1/2019 | Schleicher et al. |
| 2019/0367087 | A1 | 12/2019 | De Grammont et al. |
| 2020/0100422 | A1 | 4/2020 | Schleicher et al. |

OTHER PUBLICATIONS

"International Application Serial No. PCT/US2021/049071, Written Opinion mailed Dec. 8, 2021", 6 pgs.

Cariou, Christophe, et al., "Automatic Guidance of a Four-Wheel-Steering Mobile Robot for Accurate Field Operations", Journal of Field Robotics, 26(6-7), (2009), 504-518.

Oksanen, Timo, et al., "Guidance system for agricultural tractor with four wheel steering", In: IFAC Proceedings Volumes, vol. 46, Issue 4, (2013), 124-129.

"Australian Application Serial No. 2021338375, First Examination Report mailed Mar. 15, 2024", 3 pgs.

"European Application Serial No. 21865196.6, Response to Communication pursuant to Rules 161(1) and 162 EPC filed Nov. 22, 2023", 1 page.

"International Application Serial No. PCT/US2021/049071, International Preliminary Report on Patentability mailed Oct. 31, 2023", 8 pgs.

"European Application Serial No. 21865196.6, Extended European Search Report mailed Aug. 9, 2024", 6 pgs.

"European Application Serial No. 21865196.6, Communication Pursuant to Article 94(3) EPC mailed Aug. 21, 2024", 7 pgs.

Tu, Xuyong, "Robust navigation control and headland turning optimization of agricultural vehicles", Graduate Theses and Dissertations, Retrieved from the Internet: URL:https: lib.dr.iastate.edu cgi viewcontent.cgi? article=4195andcontext=etd [retrieved on Jan. 22, 2019] Chapters 3 and 4, (Jan. 1, 2013), 179 pages.

"Brazil Application Serial No. BR112023004016-7, Office Action mailed Sep. 3, 2024", W English translation, 12 pgs.

"Canadian Application Serial No. 3, 191,222, Examiners Rule 86(2) Report mailed Jun. 13, 2024", 4 pgs.

"Australian Application Serial No. 2021338375, Response filed May 27, 2024 to First Examination Report mailed Mar. 15, 2024", 16 pgs.

\* cited by examiner

POWER PLATFORM WITH FOUR WHEEL STEERING/REAR WHEEL STEERING

TECHNICAL FIELD

Embodiments described herein generally relate to automatic steering control of agricultural machines and more specifically to steering control of multiple steering mechanisms of an agricultural machine.

BACKGROUND

Modern agricultural operations generally include the use of agricultural machines (e.g., tractors, harvesters, sprayers, seeders, tillers, combines, etc.) to process fields by planting, harvesting, or generally tending to a crop. Agricultural machines include, in various examples, control systems that automate, or assist operators in, the execution of these operations. The steering control systems provide operators with information such as a direction or speed of the vehicle, agricultural implement data, or agricultural product application rate. These steering control systems also help agricultural machines navigate a field according to predetermined paths or trajectories (hereinafter, "guidance path").

SUMMARY

In some situations, an agricultural machine that operates under the control of a steering control system can deviate from a guidance path. In these situations, the steering control system navigates the agricultural machine from an off-path position back toward the guidance path, for instance by way of feedback control based on a measured error. In one example crop rows correspond to a guidance path, for instance crop rows generally follow the contour of a guidance path and are, in some examples, considered equivalent to the guidance path. Some agricultural machines include sensors configured to ascertain two guidance parameters that are provided to the steering control system to identify deviations from a guidance path: track-angle error (TKE) and cross-track distance (XTK). TKE corresponds to the angle between the forward direction of the agricultural machine and, for example, crop rows such that, when the agricultural machine is following the crop rows the TKE is 0° and when the agricultural machine is moving perpendicular to the crop rows the TKE is 90°. Accordingly, the TKE is considered the current angle-of-attack for agricultural machine moving toward one or more crop rows. The XTK distance is the lateral distance between the current position of the AEQ and the crop related row. Using TKE and XTK as parameters to the steering module enables a steering controller to effectively guide an agricultural machine from an off-path position to a guidance when the off-path position of relatively close to the guidance path. In contrast, with off-line positions that are relatively far from a guidance path (conversely not proximate to the guidance path) the steering controller uses guidance parameters from other sensors, such as positional data generated by a GPS device, to guide an agricultural machine from an off-path position toward the guidance path.

Some agricultural machines are configured to be driven in a single axle two-wheel active steering mode, a dual axle four-wheel active steering mode, or in a dual axle independent front and rear wheel active steering mode. The term active steering denotes an agricultural machine where driver or machine operator input and steering angle of an axle or set of wheels is continually adjusted, such as by a steering controller. The steering controller is generally configured to steer or navigate an agricultural machine one of these steering modes.

The present inventors have recognized that, among other things, a problem to be solved includes controlling an agricultural machine to correct cross track error and track-angle error while reducing or limiting vehicle rotation. In an example, a steering controller can steer an agricultural machine in a first direction along a guidance line to process a first crop row. At the end of the first crop row, the guidance line is, in various examples, adjusted to cause the steering controller to guide the agricultural machine according to a new guidance line along an adjacent second crop row in a second direction opposite the first direction. The steering controller, in various examples, guides the agricultural machine from an off-line position at the end of the first crop row to an on-line position at the start of the second crop row by steering the machine along a curved path that extends beyond the first crop row and returns to, or culminates at the on-line position at the start of the second row. Some agricultural machines, such as a front wheel drive machine configured with a large boom, traverse a large area during these operations, cause significant dynamic movement in equipment such as sprayer booms (e.g., whipping that may cause damage to the boom), and may consume a signification amount of time in the process. Accordingly, executing these operations reduces, in various examples, productivity while also wasting resources such as agricultural products being applied by the agricultural machine. As described above, executing these operations cause, in various examples, the yaw or horizontal rotation of the agricultural machine to change at a high rate. If the agricultural machine is equipped with a large implement that extends longitudinally from the machine, such as a large boom, the yaw rate of the machine while executing these operations cause, in various examples, whipping of the implement that stresses the implement or cause vibrations or swinging that can waste agricultural product or damage the implement.

In some situations, the rear axle of an agricultural machine deviates from a guidance path while the front axle remains substantially on-line (e.g., on the guidance line). For instance, even with the front ground engaging elements of the front axle on-line, on a hill or during a turn the rear ground engaging elements drift off-line and crush crop. A steering controller corrects, in some examples, the deviation by temporarily steering the front axle off-line (e.g., off of, or away from, the guidance line) while the agricultural machine drives a distance to correct the position of the rear axle. Correcting the position of the agricultural machine according to this techniques, however, can cause additional crop damage or may result in reduced productivity due to the time the vehicle spends moving between off-line and on-line positions to adjust positioning of the rear axle and its rear ground engaging elements.

Some agricultural machines are configured to switch between two or more steering modes. These agricultural machines are typically configured with two or more distinct sets of tuning parameters for configuring or operating a steering controller in each steering mode. Effectively, the distinct tuning parameters are used to virtually operate the vehicle as a second different vehicle because of the second, different, steering mode. Such tuning parameters include gains, offsets, or other adjustable parameters determined according to a machine characterization process. In an example, an agricultural machine switches from a first steering mode (e.g., single axle or two wheel driving) to a second steering mode (e.g., dual axle or four wheel driving)

by changing the set of tuning parameters used to configure the steering controller from a first set of tuning parameters for operating the controller in the first steering mode to a second set of tuning parameters for operating the controller in the second steering mode. Each set of tuning parameters is uniquely characterized for their associated steering mode. The parameters within one set of tuning parameters are, therefore, generally not shared between steering modes. Accordingly, steering algorithms and controllers are configured with various work arounds, corrections or the like to operate with the different parameters while providing the different steering modes. In an example, steering algorithms that are configured to steer a machine according to a first steering mode are modified or patched to steer in a steering according to a second steering mode. Such modifications or patches, in some examples, result in increased code size or more complicated steering algorithms that more prone to errors or instability. The modified or patched steering algorithms, in various examples, stress and impair the performance of the steering controller, such as by causing the controller to process input parameters whose values have substantially different or incompatible ranges for different steering modes. The modifications or adjustments, in various examples, include scaling the incompatible parameters. Such scaling, however, causes, in various examples, the controller to generate poor or suboptimal steering solutions that, in some cases, cases cause the steering controller to steer a machine along longer or oscillating approaches to a guidance path. In some examples, entirely different steering algorithms are used with each set of tuning parameters. Using the different algorithms requires, in various examples, the maintenance of different code bases for each algorithm or the generation and maintenance of two or more turning parameters sets for a single machine. Additionally, switching between entirely different tuning parameters when switching between steering modes can stress the steering controller by drastically changing the range of inputs values and output signals processed by the controller and, in various examples, change the configuration or operation of a steering controller to such a degree that agricultural machines are inhibited from dynamically (e.g., while the machine is actively driving or being steered) switching between steering modes.

The present disclosure includes subject matter that provides solutions to these problems or challenges by providing a steering controller that is configured to independently steer each axle of at least two axles of an agricultural machine to correct both a positional and rotational errors relative to a guidance path. In an example, the steering controller automatically steers both a front and rear axle of an agricultural machine to at matching angles to correct an error in the position of the machine. In another example, the steering controller automatically steers the front axle of the agricultural machine to correct an error in the yaw or horizontal rotation of the machine. Additionally, the present steering controller uses shared tuning parameters in front axle and dual axle steering to conduct the corresponding steering modes. With the shared tuning parameters used with the described steering controller one or more of oscillation or long approaches to guidance paths are minimized in each of the steering modes in comparison to previous steering controllers that used different sets of tuning parameters, different steering controllers or the like to conduct different steering modes.

The disclosed steering controller is configured to process input parameters (e.g., such as cross-track error, track error, curvature offset and yaw rate error) that are converted to a common unit (e.g., angles) though a control model that is constructed according to a set of vehicle behavioral parameters. In an example, the vehicle behavioral parameters include acceleration (e.g., specified G-force) and vehicle parameters, such as kinematic characteristics including wheel base, maximum wheel angles, and maximum steering rates. The steering controller has a reduced set of adjustable gains as compared to other steering controllers, which improves stability and reduces the amount of machine characterization for configuring the controller for use with a specified agricultural machine. The steering controller also provides each of multiple machine steering modes including 2-wheel active front steering. 4-wheel active steering, and independent front and rear wheel active steering. The steering controller is further configured to dynamically switch between these steering modes without requiring access to different sets of tuning parameters or different code bases for each mode. Instead, the steering controller uses a common set of shared tuning parameters and a shared control model to steer the machine in each of the steering modes described herein.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
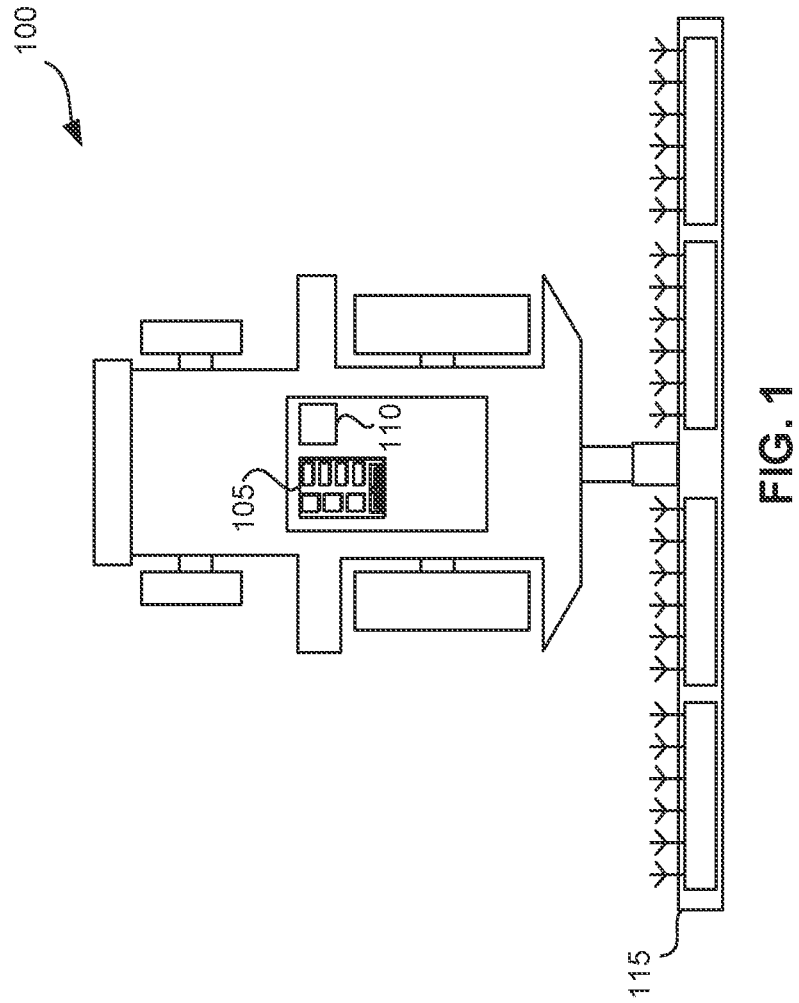
FIG. 1 illustrates an example of a machine that is configured to implement the techniques described herein.

In an example, an agricultural machine is provided for performing a task in a field. The machine may be any agricultural machine (hereinafter, "machine"), including combines, harvesters, planters, sprayers, tractors, or the like that traverse a field to perform a task. The tasks include, in various examples, harvesting, planting seeds, spraying crops, applying agricultural product, including but not limited to solid products including granular fertilizer, liquid products including fertilizers, herbicides, or pesticides.

The machine includes, in various examples, one or more control systems or machine controllers that are configured to guide the machine as it performs a task in a field. In an example, the control systems include a path planner that is configured to determine or provide a guidance path for the machine. The path planner provides a target heading or guidance line for the machine to follow as is traverses a field. In another example, the control systems include a steering controller that is configured to steer one or more axles or wheel (other ground engaging element) pairs of the machine to adjust the position or orientation of the machine according to a target heading or guidance line provided by the path planner. Although the present disclosure ascribes operations, features, modules, or components, to a particular controller, this is done for ease of discussion and such operations, features, modules, or components are, in various examples, performed by, or is incorporated in, one or more of the controllers or control systems described herein.

The machine, in various examples, includes one or more sensors that are configured to measure, or to generate information that is indicative of, characteristics of the machine or an implement associated with the machine. The sensors include position or orientation sensors that are configured to measure the position or orientation of the machine in a field. Such sensors, in various examples, include global positioning systems sensors (GPS), optical sensors such as video or digital cameras, touchless sensors such as sonic and electromagnetic wave sensors, or tactile sensors. These sensors generate measurements or other information that are used by a control system to determine the XTE and TKE of the machine relative to a crop row or a guidance line. In an example, the sensors generate measurements that are useful for determining the XTE or TKE of a point on one or more axles of the machine or at any other point on the machine. The sensors, in some examples, include behavioral sensors that measure the speed, acceleration, or yaw rate of the machine or any point on the machine.

The steering controller, in various examples, is configured to steer the machine from an off-line position (e.g., a position that the machine is not following, or is not on, a guidance line) along, for example, a curved or circular path toward a guidance line or an on-line position (hereinafter, "on-line" or "on-line position"). The steering controller receives a set of machine position, origination, and behavior inputs, as wells as a guidance line parameter. The steering controller uses this information to steer or adjust the angle (e.g., the yaw) of one or more axles of the machine to adjust the position or orientation of the machine responsive to the guidance line parameter. In an example, the steering controller adjusts the position or orientation of the machine by generating a target curvature which is then converted to a steering angle for one or more axles or other steering mechanisms of the machine based on a particular machine model. The target curvature or steering angle is then provided to an actuator or a steering interface of one or more of the axles to steer the machine.

The steering controller receives input, such as from one or more sensors, that is indicative of a measure characteristic (e.g., a behavior characteristic) of a machine. In some examples, the received input, or the measured characteristic, include information that is useful for determining a cross-track error (XTE), track error (TKE), yaw rate error (YRE), or a curvature offset (CO) for the machine. The received input, in some examples, include electrical signals, data values, or any other information that is indicative of, or useful for determining, the values of these parameters. In an example, XTE is a perpendicular distance from the machine to a guidance line or guidance vector (hereinafter, "guidance vector"), such as provided by the path planner. The distance is, in various examples, determined relative to any point on the machine, such as a point at the center or a rear axle of the machine. In another example, TKE is an angular error determined as the difference between the machine yaw and a guidance vector orientation or angle. In yet another example, CO is a curvature of the guidance vector as the machine approaches within a threshold distance of the guidance vector. In yet another example, YRE is an angular velocity determined as the difference between the machine yaw rate and a specified target yaw rate, such as determined by the product of the machine velocity and CO. The specified target yaw rate is an example of a guidance vector yaw rate.

In an example, the steering controller is configured as a closed loop control system that receives input or error parameters XTE, TKE. YRE and CO and sums or combines these parameters based on a machine model, machine behavioral parameters, and specified or selected machine steering modes to generate a target curvature for steering the machine. Prior to the summing or combining, all the input parameters are converted to the same numerical or physical unit (hereinafter, "unit"). More specifically, XTE is converted from a distance to an angle to match the units of the remaining input parameters. This conversion improves operation of the steering controller by ensuring all inputs to the controller model are represented in a common domain that preserves the information provided by the inputs without allowing any one input (e.g., XTE) to have an influence the model that is disproportionate to the information it provides. In an example, this ensures that controller model is primarily influenced by the amount of error indicated by XTE and not the scale or size of the values used to represent the error. The steering controller converts, in various examples, XTE to an angle by mapping XTE to the tangent angle of a curve (e.g., a circle). One example of this type of curve and tangent conversion is graphically shown in FIG. 5B. The curve 510 represents a curve path traversed by the machine while the steering controller steers the machine to approach the guidance vector 515. In an example, the radius R of the curve 510, or the radius of curvature of the curve, is selected as the smallest radius selected from a first radius determined based on the minimum turning radius of the machine and a second radius determined based on a user defined machine behavior or machine experience parameter, such as the maximum lateral G-forces experienced in the vehicle during a steering operation. The maximum curvature or the steering angle of the machine then be determined as the reciprocal of the selected radius. In an example, the radius of the curve is determined as shown in equations 1-3:

$$\text{MAX\_VEH\_CURVATURE} = \frac{1}{R_{VEH}} = \frac{\tan(\text{MAX\_WHEEL\_ANGLE})}{\text{WHEEL\_BASE}} \quad (1)$$

$$\text{MaxG\_Curvature} = \frac{1}{R_G} \times \frac{\text{MAX}_G \times 9.81}{\text{velocity}^2} \quad (2)$$

$$maxCurvature = \min(\text{maxG\_Curvature}, \text{MAX\_VEH\_CURVVATURE}). \quad (3)$$

In equation (1), MAX_VEH_CURVATURE is the minimum turning radius based maximum curvature of the machine or the largest steering angle of the machine. In an example, the minimum turning radius is the radius of the smallest or tightest circle that machine can make during a turning operation. The term $R_{VEH}$ is the radius of a curve determined by the maximum wheel angle MAX_WHEEL_ANGLE (or the largest angle the wheels or ground engaging element can make relative to a longitudinal axis) and the wheel base WHEEL_BASE (distance between front and rear wheels or ground engaging elements) of the machine. In equation (2), maxG_Curvature is the G-force or acceleration based maximum curvature of the machine. RG corresponds to the smallest radius of a curve around which a machine can be steered to cause the machine or a user to experience a user provided maximum G-force MaxG at a user specified velocity of the machine. In equation (3), maxCurvature is the maximum curvature of a machine (e.g., the maximum curvature signal provided by the steering controller) as determined by the selected radius R in FIG. 5B (e.g., the minimum of $R_{VEH}$ and RG).

The steering controller, in some examples, uses the selected radius R to convert XTE (520 in FIG. 5B) to a cross track angle XTA (525 in FIG. 5B) and a cross track curvature XTC (illustrated as the curvature 510 or the quantity 1/R), such as shown in equations (4) and (5):

$$XTC = maxCurvature \quad (4)$$

$$XTA = \mathrm{acos}\left(\frac{R - \mathrm{abs}(XTE)}{R}\right), \quad (5)$$

where abs( ) is the absolute value function and acos( ) is the arccosine function. The term XTA may be referred to herein as the "target yaw" of the curved path traversed by the machine while the steering controller steers the machine to acquire the guidance vector.

The steering controller is configured to use XTC to offset or adjust the output target curvature while steering the machine along the curved path toward the guidance vector. The steering controller then transitions from using XTC to using the curvature offset CO of the guidance vector. The steering controller facilitates the gradual switching between XTC and CO by replacing XTC and XTA with corresponding weighted terms or signals WXTC and WXTA using a weighting XTC and XTA based on the wheel base of the machine, the machine control system latency or steering rate, and the speed of the machine as the machine approaches the guidance vector. The machine wheel base, in conjunction with one or more user specified machine behavioral preferences (e.g., overshoot for more or less aggressive transitions), provides an indication of the distance at which to start the gradual transition. In an example, high system latency or slow machine steering rate increase the time it takes to execute the transition. In another example, the steering controller may be configured to initiate transition at an earlier time (corresponding to greater distance from the guidance path) at higher machine speeds than at lower machine speeds (having a later time for transition corresponding to a smaller distance from the guidance path).

The steering controller, in various examples, is configured to generate the weighted terms WXTA and WXTC by determining the dynamic weighting term weight according to equations (6)-(8):

$$\text{transition\_time} = \frac{\mathrm{abs}(XTC - CO)}{maxCurvatureRate} + \text{system\_latency} \quad (6)$$

$$\text{transistion\_distance} = \frac{\text{transition\_time} \times \mathrm{abs}(\text{velocity}) + acquireRate \times \text{WHEEL\_BASE}}{\cos(TKE)} \quad (7)$$

$$\text{weight} = \frac{\mathrm{abs}(XTE)}{\text{transistion\_distance}}, \quad (8)$$

In equations (6), transition_time is the time required to execute the transition. MaxCurvatureRate is a curvature rate determined by the maximum steering rate of the machine. System latency is the latency of the machine control system. The system latency, in some examples, is primarily refers to delays in the system response attributable to the hydraulics of the machine, such as the time it takes the hydraulics to react to commanded steer values, the maximum steering rate of the machine, and the maximum rate at which the hydraulics can actuate or move. In equation (7), transition_distance is the distance from the guidance vector that the transition begins. AcquireRate is a user defined tuning parameter. AcquireRate, in various examples, is set to 1 to cause the steering controller to initiate the transition and follow the guidance vector when the front wheels, or front axle, of the machine reach the guidance vector. In another example, AcquireRate is set to a value less than one to initiate the transition before the machine reaches the guidance vector, such as to enable a slower or more controlled transition.

The steering controller determines WXTC and WXTA (such as to adjust XTC and XTE based on the curvature offset of the guidance line) according to equations (9) and (10):

$$\text{WXTC} = (\text{weight} \times \text{XTC} + (1 - \text{weight}) \times \text{CO} \quad (9)$$

$$\text{WXTA} = \mathrm{acos}(1 - \mathrm{abs}(\text{weight} \times \text{XTC} \times \text{XTE})) \quad (10)$$

The steering controller, in some examples, uses the weighted cross track curvature WXTC and the weighted cross track angle WXTA to determine the output target curvature targetCurvature according to equation (11):

targetCurvature=yawGain×(WXTA+TKE)+WXTC (11)

where yawGain is a tunable parameter.

In some examples, the steering controller is configured to determine the target curvature according to one or more additional parameters that enables the steering controller to tunably control one or more additional behavioral characteristics of the machine. In an example, the steering controller determines the output target curvature based on a differential component or error, such as yaw rate or yaw rate error, as shown in equation (12):

targetCurvature=yawGain×(WXTA+TKE)+yawRateGain×YRE+WXTC (12)

where yawRateGain is a tunable parameter. In an example, the steering controller generates an output target curvature for steering a machine to a guidance vector based on a target yaw rate, such as provided by a user or machine operator to limit the yaw rate of the machine. The target yaw rate YRE, in various examples, is selected to limit implement stress or swing to a desired degree of amount of stress or a desired degree of swing prescribed by an operator.

The steering controller, in various examples, limits the output target curvature based on maxCurvature, such as by setting targetCurvature equal to maxCurvature when targetCurvature is larger than maxCurvature or by setting targetCurvature equal to −maxCurvature when targetCurvature is smaller than −maxCurvature.

Control Modes

The techniques described herein provides a steering controller that is configured to stably steer an agricultural machine from an off-line position to a guidance vector using one or more of an AFS, 4WS, or AFRS steering mode without requiring the use of individual or distinct tuning parameter sets for each mode. The techniques, in various examples, enable to a user or machine operator to dynamically switch between driving modes, such as while the machine is traversing a field. In an example, after processing a set of crop rows, a machine operator manually switches steering modes, such as by pushing a button in the cab of the machine, from an AFS or 4WS mode to an AFRS mode, such as to cause the steering controller to adjust the XTE of a machine to laterally move the machine a specified distance, such as across one or more crop rows, without changing the heading (e.g., orientation) of the machine. In another example, the steering controller automatically switches between steering modes based on the tasked being performed by the machine, the field conditions, guidance parameters, or any other condition or criteria.

In an example, in each steering mode, one or more axles of the machine are controlled by a target output curvature generated by the steering controller by converting the target output curvature generated by the steering controller for each axle to a target steering angle. Generally, target steering angle is equivalent to the arctangent of the product of the target output curvature and the wheel base of the machine.

AFS

In AFS mode, the steering controller is configured to steer a single axle (e.g., the front axle) of the machine using the target output curvature. Accordingly, the steering angle of the axle, in various examples, is determined as the product of the target out curvature and the wheel base of the machine.

4WS

In 4WS mode, the steering controller steers the front and rear axles of the machine at opposite steering angles. Accordinglym the steering controller, in various examples, is adjusted to steer the machine in 4WS mode by setting the target curvature of a front axle (e.g., the front axle) to targetCurvature and the target curvature of a second axle (e.g., the rear axle) to −targetCurvature. In an example, maxCurvature is then adjusted based on the maximum front wheel angle, the maximum rear wheel angle, and the wheel base WHEEL_BASE of the machine, as shown in equation (13):

maxCurvature=tan(max_wheel_angle_front)−tan(max_wheel_angle_rear))/WHEEL_BASE (13).

The steering controller, in various examples, sums or otherwise combine the target curvature of each axel to produce a combined target curvature totalCurvature. The steering controller then limits the totalCurvature based on maxCurvature using the previously describe limiting technique. The limited totalCurvature is then be allocated to a front target curvature targetCurvatureFront and a rear target curvature target curvatureRear, as shown in equations (14) and (15):

$$targetCurvatureFront = \frac{totalCurvature}{2} \quad (14)$$

$$targetCurvatureRear = -\frac{totalCurvature}{2}. \quad (15)$$

It is worth noting that the only changes required to enable 4WS mode relates to changes to the machine model (e.g., the maximum wheel angles).

AFRS

In AFRS mode, the steering controller is configured to steer the machine to reduce vehicle yaw rate-rate or steering rate thereby reducing machine jerk. In an example, the steering controller is configured to reduce total yaw rate of the machine when steering the machine towards a guidance vector. This provides the benefit of reducing the amount of boom swing on some implements, such as sprayers.

In an example, the steering controller steers the machine in AFRS mode by always steering a first and a second axle of the machine at a fixed ratio of front axle target curvature targetCurvatureFront to a rear axle target curvature targetCurvatureRear. This technique substantially reduces yaw rate at the cost of extending the time it takes to acquire the guidance vector.

In another example, the steering controller steers the machine in AFRS mode using a crabbing technique whereby positional errors (e.g., XTE) contributes to an output curvature that the steering controller adds to both axles of the machine. This results in automatic crabbing (e.g., lateral movement of the vehicle caused by driving a machine while axles of the machine are oriented in the same direction) to correct positional errors. The steering controller, in various examples, sum or otherwise combine error associated with machine orientation (e.g., TKE, WXTC, and YRE) and allocate or distribute an output curvature determined based on the summed errors to the front and rear axles in opposite directions. In an example, a position contribution PC is calculated as a product of a positional gain (e.g., a tunable parameter) and WXTA, while a rotational contribution RC is calculated as a product of a yawGain and TKE summed with WXTC, as shown in equations (16) and (17):

PC=positonalGain×WXTA (16)

RC=yawGain×TKE+WXTC (17).

The front axle target curvature targetCurvatureFront and a rear axle target curvature targetCurvatureRear is then determined according to equations (18) and (19):

$$targetCurvatureFront = PC + rotationalWeight \times RC \quad (18)$$

$$targetCurvatureRear = PC + (rotationalWeight - 1) \times RC \quad (19)$$

In equations (18) and (19), rotationalWeight is a number between 0 and 1 that determines the distribution or allocation of the rotation correction of both axles. In an example, rotationalWeight is set to 1 to cause the steering controller to use the only the front axle to correct rotations. In another example, rotationalWeight is determined in real time during operation of the machine, such as according to field conditions (e.g., slopes) or curvature of approaching turns.

In an example, the steering controller is configured to limit curvature output based on equations (20)-(23):

$$totalCurvature = targetCurvatureFront + targetCurvatureRear \quad (20)$$

$$targetCurvatureFront = targetCurvatureFront \times abs\left(\frac{maxCurvature}{totalCurvature}\right) \quad (21)$$

$$targetCurvatureRear = targetCurvatureRear \times abs\left(\frac{maxCurvature}{totalCurvature}\right) \quad (22)$$

A steering controller operating in AFRS mode, in various examples, steers a machine to acquire a guidance vector in significantly less time than a controller operating in another driving mode, as described herein. The term MAX_G, as used in equation (2), is be adjusted to change steering aggressiveness or to adjust vehicle yaw rate.

FIG. 1 illustrates an example of a machine 100 that is configured to implement the techniques described herein. The machine 100 includes, in various examples, any agricultural machine that is provided to perform a task such as processing a field by applying a product, such as a mixture of agricultural products, to the field or other land region. In an example, the machine 100 is an agricultural sprayer that is configured to distribute agricultural products to crops. In some examples, the machine 100 includes a machine controller 105, a sensors 110, and implement 115. The machine controller 105 includes, in various examples, one or more hardware circuits or software applications that are configured to control the operation of the machine 110, such as by generating a guidance vector and automatically steering the machine according the guidance vector and input received from one or more of the sensors 110. The sensors 110 include, in various examples, any of the position, orientation, behavioral, or other sensors described herein. The implement 115 includes, in various examples, any machine actuatable or controllable implement, such as a boom or a sprayer, for applying a product to a field.

Figure 2:
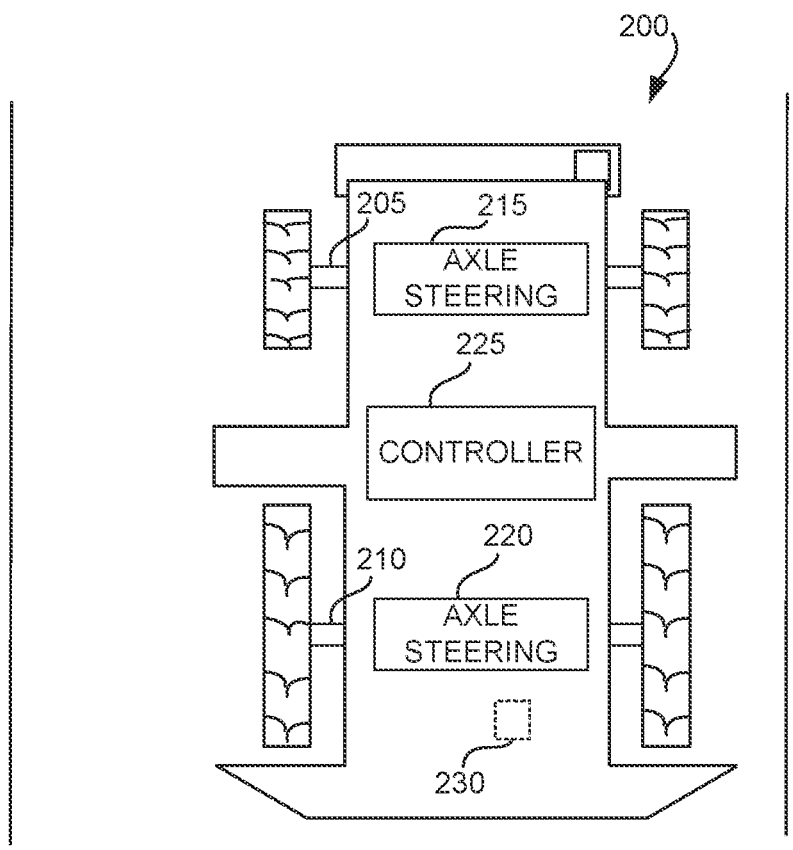
FIG. 2 illustrates another example of a machine that is configured to implement the techniques described herein.

FIG. 2 illustrates another example of the machine 200, such as the agricultural machine 100. As shown in FIG. 2, the machine 200 includes, in various examples, a first axle 205, a second axle 210, a first steering mechanism 215, a second steering mechanism 220, a steering controller 225, and sensors 230. In an example, the first axle 205 and the second axle 210 are, respectively, the front and rear axles of the machine 200. In another example the first axle 205 and the second axle 210 are each configured to be independently steered by the first steering mechanism 215 and the second steering mechanism 220, respectively. The first steering mechanism 215 and the second steering mechanism 220 include, in various examples, electrical, mechanical, and software components that are configured to steer the first axle 205 and the second axle 210 according to an output curvature generated by the steering controller 225. In an example the first steering mechanism 215 and the second steering mechanism 220 are coupled to the first axle 205 and the second axle 210 through a first or second steerable axle interfaces (not shown), such as electrical and mechanical linkages or actuators. In an example, the first steering mechanism 215 is configured to steer the first axle in a first direction and the second steering mechanisms 215 is configured to steer the second axle in a second direction independent of the direction of steer of the first axle. The steering controller 225 is, in various examples, a component of the machine controller 105 and may include electrical circuits or software modules that are configured to receive vehicle measurements (e.g., speed, position, and orientation measures such as obtained by the sensors 110) from the sensors 230 and implement the techniques described herein.

Figure 3:
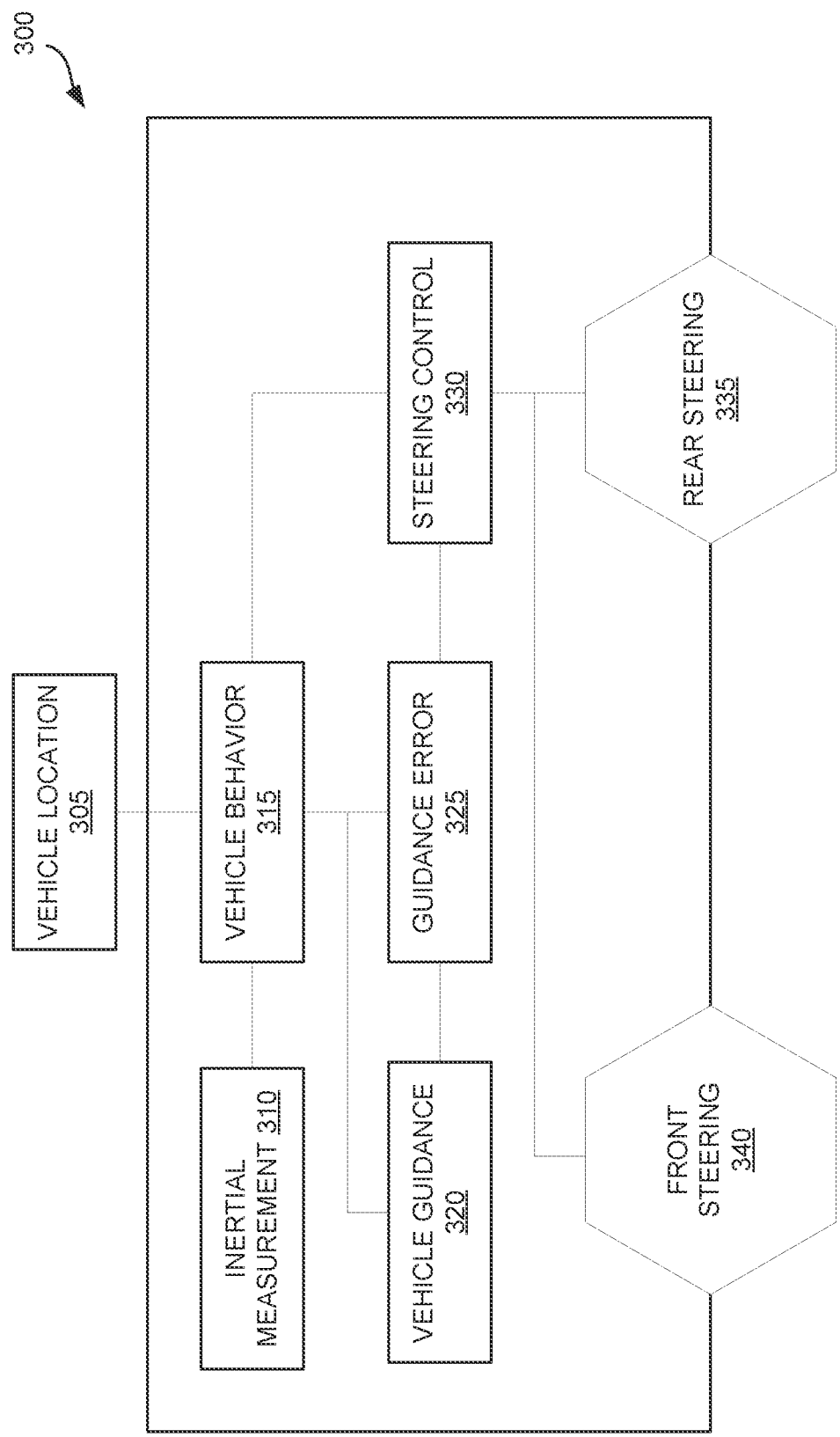
FIG. 3 illustrates an example of steering system of an agricultural machine, such as the agricultural machine or the agricultural machine.

FIG. 3 illustrates an example of steering system 300 of an agricultural machine, such as the agricultural machine 100 or the agricultural machine 200. In an example, the steering system 100 is configured to automatically, or with user input, steer the agricultural machine according to specified guidance information provided by a guidance vector, as described herein. In an example, the steering system 300 includes vehicle location component 305, inertial measurement component 310, vehicle behavior module 315, vehicle guidance component 320, guidance error component 325, and steering control component 330. In some examples, the steering system 300 includes front steering component 335 and rear steering component 340. The vehicle location component 305 and inertial measurement component 310 are configured to measure the agricultural machine's position, orientation, speed, and acceleration. The vehicle behavior component 315 is configured to adjust, such as by limiting or conditioning using other techniques, the vehicle location and inertial measurements, or information that is indicative of the measurements, based on one or more specified vehicle behavior parameters (e.g., maximum acceleration, speed, or yaw rate). The vehicle behavior component 315 then provides the adjusted measurements to the guidance component 320, the guidance error component 325, and the steering control component 330. The guidance module 320 generates, in various examples, a guidance vector, while the guidance error component 325 determines, based on the guidance vector and the vehicle location measurements, machine's XTE, TKE, or YRE. The steering control component 330 is, in various examples, an example any of the steering controllers described herein. In an example, the steering control component 330 is configured to obtain vehicle measurements (e.g., speed, position, and orientation measures such as obtained by the sensors 110) from the vehicle behavior component 325 or from the vehicle location and inertial measurement components, and use this information to adjust, such as by providing a front wheel and rear while steering curvature) the steering of the agricultural machine 300 according to any of the steering techniques described herein. In an example the steering control component 330 is configured to steer the front and rear wheels of the agricultural machine 300 at substantially equal angles to correct errors in the position of the machine relative to guidance vector determined by the vehicle guidance component 320 or guidance error component 325. In another example, the steering control component 320 is configured to steer a front axle of the agricultural machine 300 to correct an error in the orientation of the machine. In yet another example, a single configuration of the steering control component 330 is configured steer the agricultural machine 300 in AFS, 4WS, and AFRS. The front steering component 340 and the rear steering component 345 include, in various examples, independently actuatable mechanisms that are configured to steer, respectively, front and rear axles of the agricultural machine 300 responsive to curvatures and steering angle signals obtained from the steering control component 320.

Figure 4A:
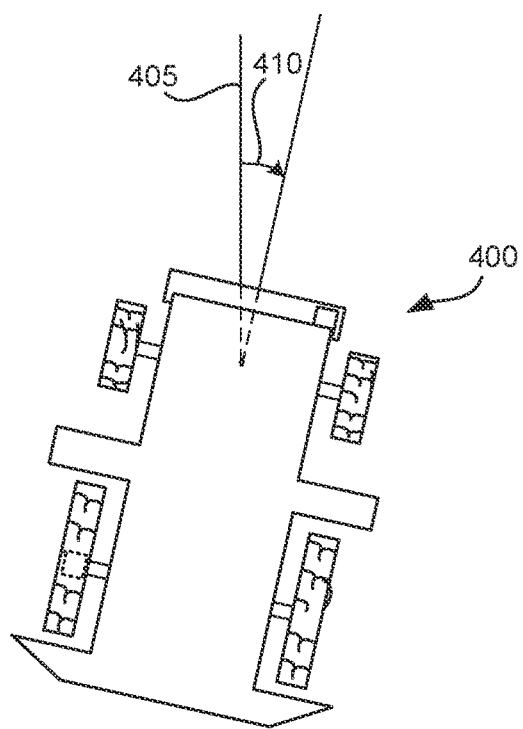
FIG. 4A illustrates an example of a machine having a steering controller that is configured to steer the machine according to a guidance line.

FIG. 4A illustrates an example of a machine 400 having a steering controller (not shown) that is configured to steer the machine according to a guidance line 405. The machine 400 is, in various examples, an example of any of the agricultural machines described herein. As shown in FIG. 4A, the orientation of the machine 400 deviates by TKE 410 from the guidance line 405. In an example, steering controller is configured or arranged to steer at least one axle of two independently steerable axles of the machine 400 to correct the error in the orientation of the machine according to any of the techniques described herein. In another example, the steering controller is configured or arranged to generate an output curvature signal that is useful to actuate at least one steering mechanism of the machine 400 to steer the at least one axle to correct the error in the orientation of the machine according to any of the techniques described herein.

Figure 4B:
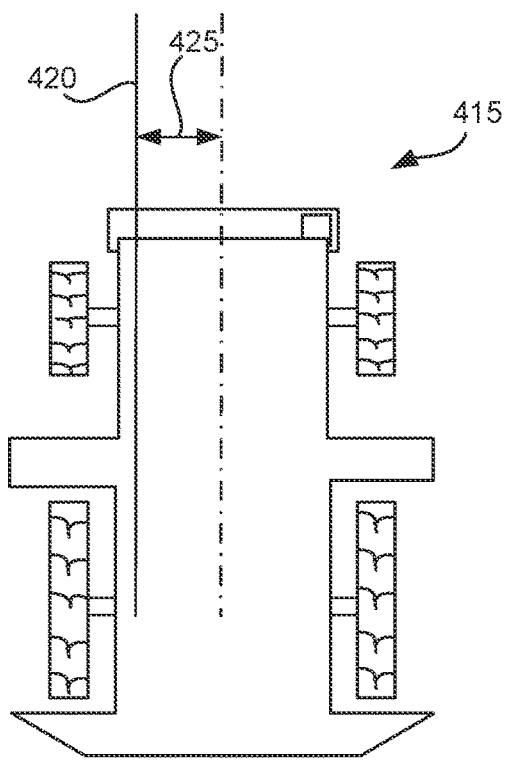
FIG. 4B illustrates another example of a machine having a steering controller that is configured to steer the machine according to a guidance line.

FIG. 4B illustrates another example of a machine 415 having a steering controller (not shown) that is configured to steer the machine according to a guidance line 420. The machine 415 is an example of any of the agricultural machines described herein. As shown in FIG. 4B, the position of the machine 415 deviates by XTK 425 from the guidance line 420. In an example, steering controller is configured or arranged to steer at least two axles of the machine 415 at the same angles to correct the error in the position of the machine according to any of the techniques described herein. In another example, the steering controller is configured or arranged to generate an output curvature signal that is useful to actuate at least two axles of the machine 415 at the same angles to correct the error in the position of the machine according to any of the techniques described herein.

Figure 5A:
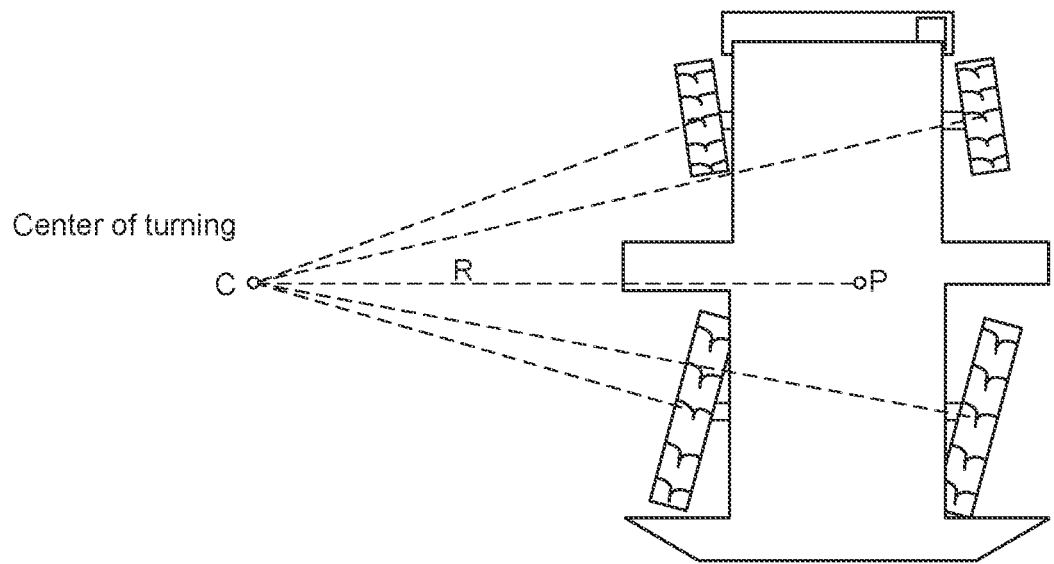
FIG. 5A illustrates an example of a machine that is steered, such as a steering controller that is configured as described herein, along a curved path towards a guidance line.

FIG. 5A illustrates an example of a machine 500 that is steered, such as a steering controller that is configured as described herein, along a curved path towards a guidance line. In an example, the curved has a center of curvature C and a radius of curvature R. The distance R corresponds to a distance from the center of curvature C to a point P on or in the machine 500. In an example, R is obtained based on the maximum turning radius of the machine 500, as described herein. In an example, the point P is midpoint of the front axle of the machine 500. In another example, the point P is point between the front axle and rear axle of the machine. In yet another example, the point P is determined based on, or is associated with, the physical characteristics of the machine 500 (e.g., wheel base, number of axles, or number of steerable axles of the machine) or dynamic properties of the machine (e.g., speed, or steering angle of one or more axles of the machine). In some examples, the machine 500, or the orientation of the machine (e.g., the orientation of a vector that is colinear with a center line of the machine), is tangential to the curve at the point P.

Figure 5B:
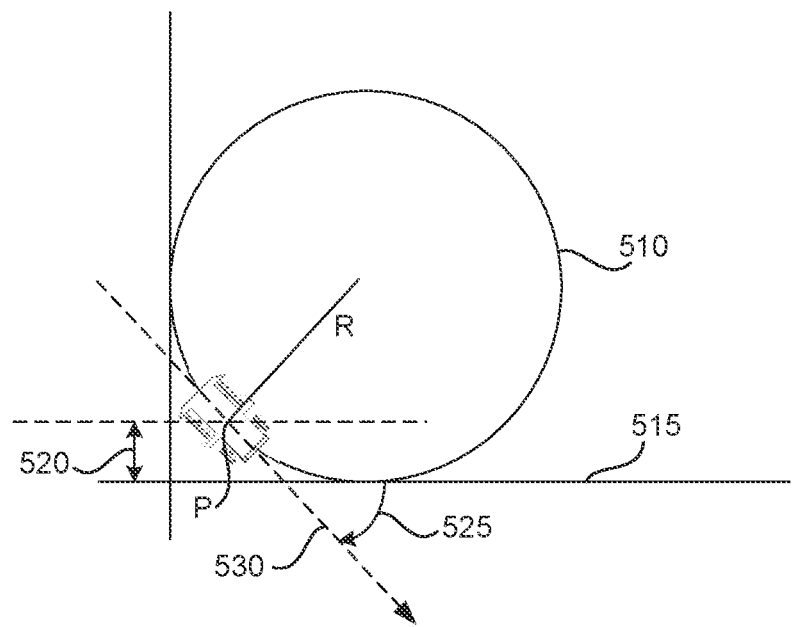
FIG. 5B illustrates an example of a machine that is steered by a controller, such as a steering controller that is configured as described herein, along curved path to acquire a guidance line.

FIG. 5B illustrates an example of a machine 505 that is steered by a controller, such as a steering controller that is configured as described herein, along curved path 510 to acquire a guidance line 515. More specifically, FIG. 5B illustrates a relationship between XTE 515 of the machine 505 and a corresponding XTA 525 as the steering controller steers the machine to acquire the guidance line. In an example the machine 505 is steered according to a tangent vector 525 along the curved path 510. In an example, the curved path 510 and the vector 525 adjust or changes as the machine is steered approaches the guidance line 515 or as one or more dynamic properties of the machine changes.

Figure 6:
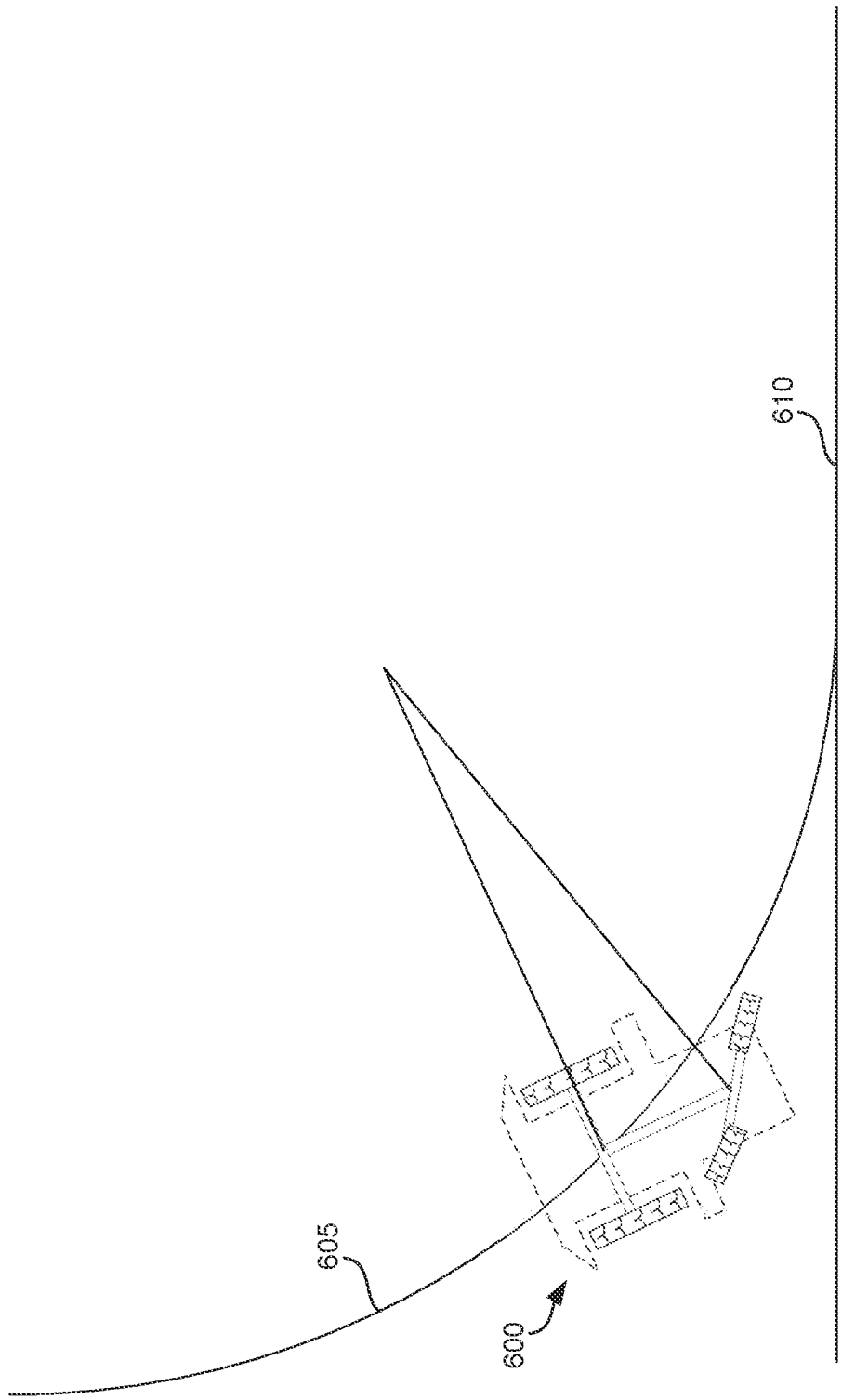
FIG. 6 illustrates an example of a steering controller steering a machine to transition the machine from a curved path to a guidance line according to the techniques described herein.

FIG. 6 illustrates an example of a steering controller steering a machine 600 to transition the machine from a curved path 605 to a guidance line 610 according to the techniques described herein. In an example, the steering controller applies XTC as an offset to control or adjust its output curvature while steering the machine 600 to acquire the guidance path. As the machine 600 approaches the guidance line, the steering controller transitions to applying a CO of the guidance line to control or adjust its output curvature. As shown in FIG. 6, a front wheel steered vehicle, in various examples, execute the transition from the curved path to the guidance line by waiting until a specified point on the machine 600 (e.g., the center of the front axle) is at a specified distance from the guidance line (e.g., at a distance where center of the front axle reaches the guidance line) and then steering front wheels at the maximum rate parallel to the guidance line and keep them parallel to target (apply the correct rate). This will cause the rear of the vehicle transition from curved path to the guidance line. For machines that are configured with at least two independently steerable axles, the specified distance from the guidance line is determined according to the techniques described herein.

Figure 7:
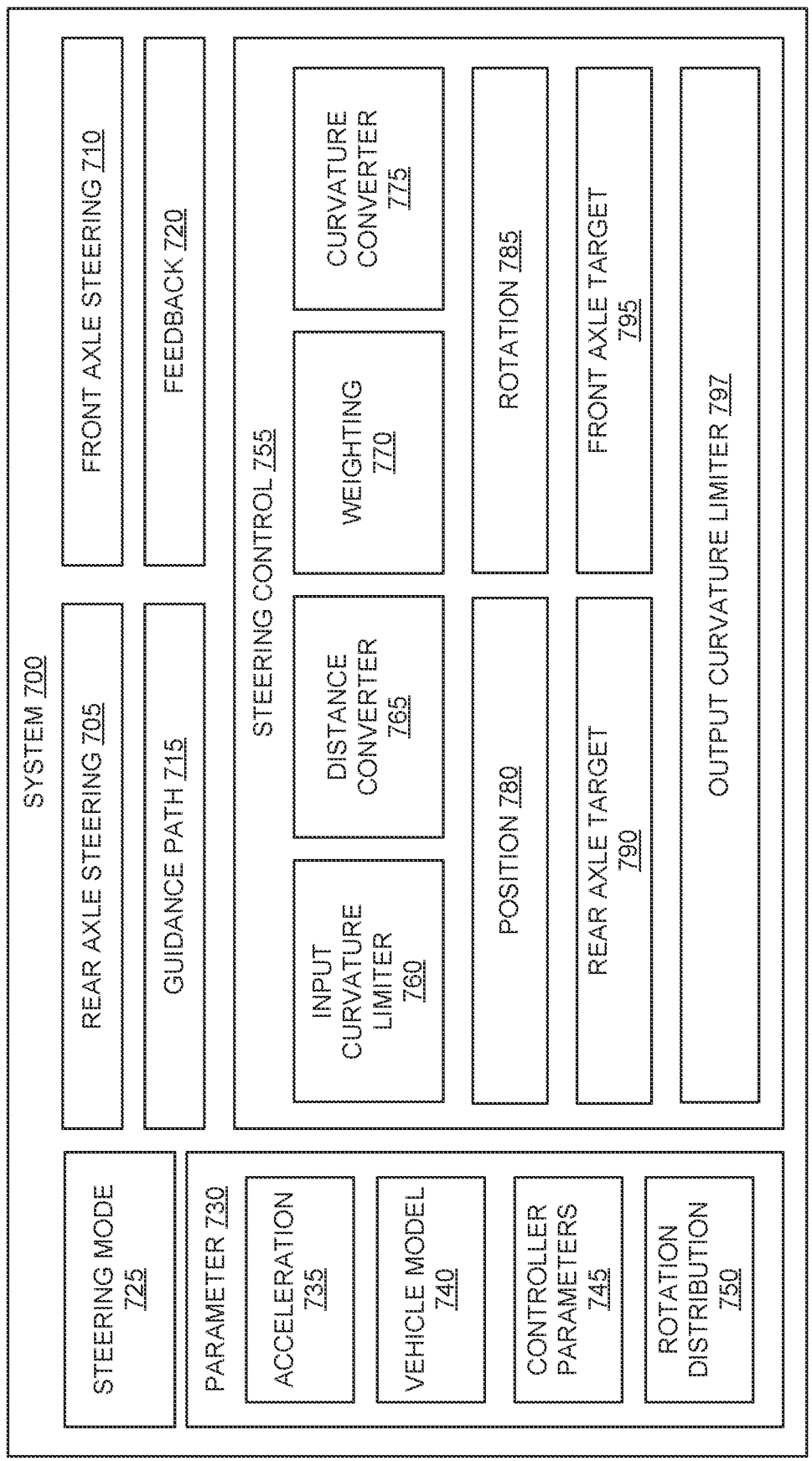
FIG. 7 illustrates an example of a navigation system for a machine.

FIG. 7 illustrates an example of navigation system 700 for a machine. The navigational control system 700 is an example of the steering system 300. In an example, the navigation system 700 includes a rear axle steering component 705, a front axle steering component 710, a guidance path component 715, ad feedback component 720, a steering mode component 725, a parameter component 730 and a steering control component 755. The rear axle steering component 705 and the front axle steering component 710 are configured to steer the rear and front axles of the machine responsive to an output curvature or steering angle signal. The guidance path component 715 is configured to determine a guidance line or guidance vector, such as for guiding the machine through a field. The feedback component 720 is configured to determine a position of the machine, and, based on the guidance line and the determined position, determine XTE and a TKE. The steering mode component 725 is configured to determine, either automatically or through a user interface to an operator, a steering mode (e.g., AFS, 4WS, or AFRS) for steering the machine. The parameter component 730 is configured to provide configurable or tunable parameters for controlling or adjusting that operation of the navigation system 700. In an example, the parameters component 730 includes an acceleration component 735 such as for storing user or operator experience parameters, such as maximum G-force, vehicle speed, steering or yaw rate, steering mode, or other performance parameters. In another example, the parameters component 730 includes vehicle model component 740, such as for storing any suitable physical parameters of the machine, such as wheel base, vehicle maximum turning rate, or controller system latencies. In another example, the parameters component 730 includes controller parameters 745, such as for storing any of the controller gains or other steering controller parameters described herein. In another example, the parameters component 730 includes rotation contribution parameters component 750, such as a storing a rotational weight (e.g., rotationalWeight) that determines the distribution or allocation of an orientation correction component of an output curvature or steering angle signal provided to, or used to actuate, rear axle steering component 705 or front axle steering component 710. These parameters include, in various examples, tuning parameters that are common to, or shared between, different steering modes.

The steering control component 755 is example of a machine steering controller, such as described herein. The steering control component 755 includes, in various examples, input curvature limiter 760, distance converter 765, weighting component 770, curvature converter 775, position component 780, rotation component 785, rear axle target component 790, front axle target component 795, and output curvature limiter 797. The input curvature limiter 760 is configured to determine a maximum curvature or steering angle for the machine, such as described in the discussion of equations (1)-(3). The distance converter 765 is configured to convert a position error, such as XTE, to a curvature or angle, such as XTA and XTC. The weighting component 770 is configured to adjust or weight XTA, XTC, or CO, such as described in the discussion of equations (4)-(10), to facilitate transition from steering the machine along a curved target path in a line acquire mode to steering the machine according to a guidance vector. The curvature converter 775 converts a weighted curvature, such as a weighted CO, to a yaw rate error. In an example, the machine yaw rate is determined by the product of the weighted CO and yaw rate error is then determined as the difference between target yaw rate and the machine yaw rate. The position component 780 is configured to determine a position contribution to, or a component of, the output curvature or steering angle of the machine based on the weighted XTA and one or more controller parameters (e.g., a position gain, a yaw gain, or a yaw rate gain). The determined contributions are provided to, or used to actuate, both a front and a rear axle of the machine. Rotation component 785 is configured to determine a rotation contribution, or a component of, the output curvature or steering angle of the machine to correct an orientation or a yaw rate of the machine, as described herein. Rear axle target 790 and front axle target 795 are used to determine front and rear components of the output curvature, or a curvature control signal, for actuating a rear or front axle steering element according to the techniques described herein. The output limiter 797 is configured to limit the target curvature for the front and rear axles according to the determined maximum curvature of the machine.

Figure 8:
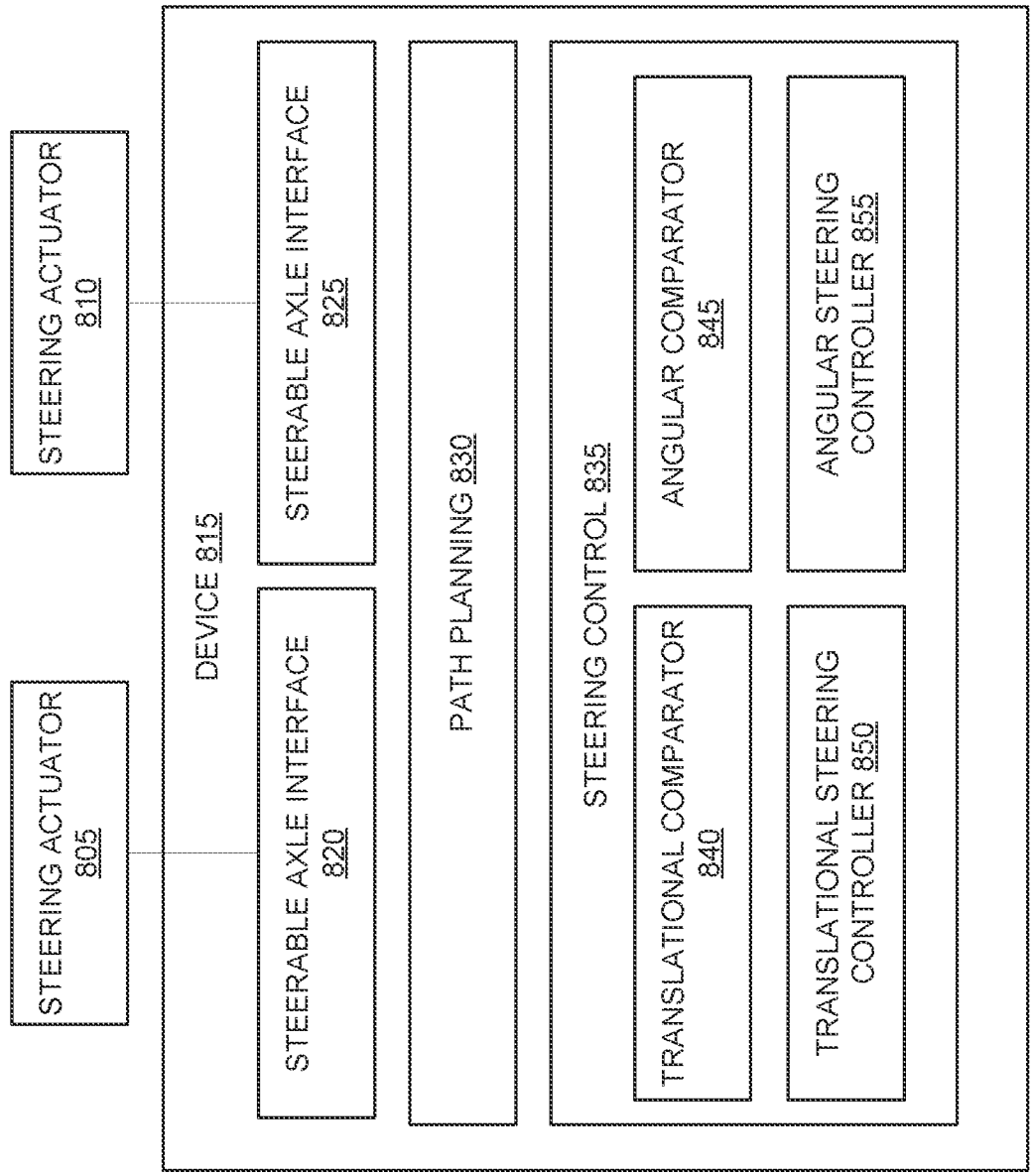
FIG. 8 illustrates an example of a device for steering a machine, such as a machine having two or more independently steerable axles.

FIG. 8 illustrates an example of a device 815 for steering a machine, such as a machine having two or more independently steerable axles. The device 815 is an example of the steering system 300. In an example the device 815 is coupled to steering actuator 805 and steering actuator 810 through steerable axle interface 820 and steerable axle interface 825, respectively. The steerable axle interface includes, in various examples, any electrical or mechanical circuit that is configured to receive control signals, such as from a steering controller, and actuate the steering actuator 805 and steering actuator 810 to turn a rear and a front axle of the machine based on the received control signals. The planning component 830 is configured to provide (e.g., generate or obtain from memory or from another computing device) a guidance path (e.g., a guidance line or guidance vector) for the machine. The steering control component 835 includes, in various examples, a steering controller that is configured according to the techniques of the present disclosure to coordinate steering of at least the steering actuator 805 and steering actuator 810. In an example, the steering control component 835 includes: a translational comparator 840 that is configured to determine a translational difference between a location of the machine and the guidance path, an angular comparator 845 that is configured to determine an angular difference between an angular orientation of the machine and the guidance path, a translation steering controller 850 that is configured to actuate the steering actuator 805 or steering actuator 810 according to the determined translational difference, and an angular steering controller 855 that is configured to actuate the steering actuator 810 according to the determined angular difference. In another example, the steering control component 835 is configured to, or includes one or more components that are configured to, implement any of the techniques described herein.

Figure 9A:
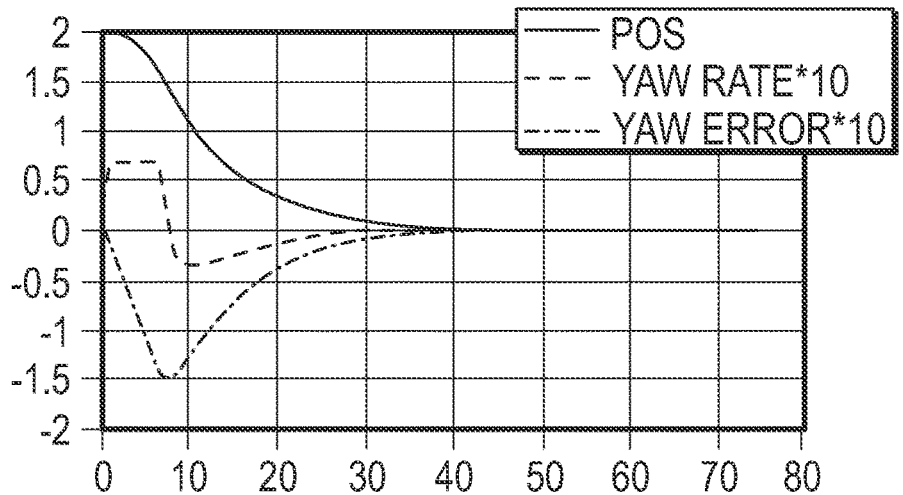
FIGS. 9A-9C illustrate plots of time verses XTE, TKE, and YRE that are generated based on a simulated example of a steering controller steering an agricultural machine in a line acquire operation.
Figure 9B:
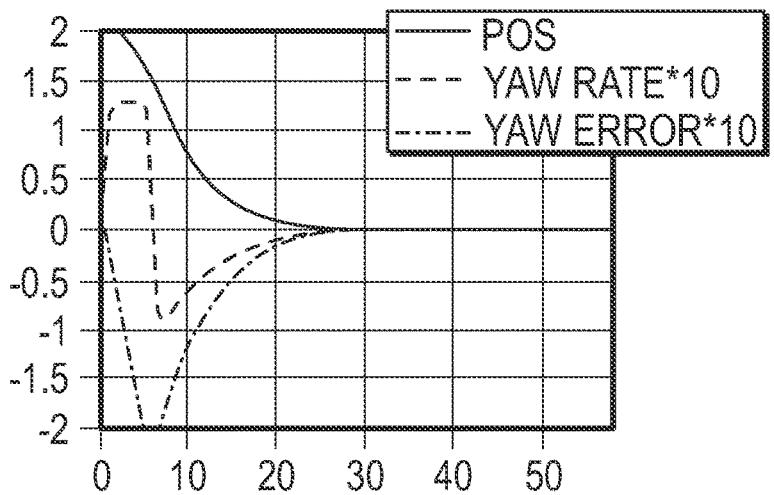
Figure 9C:
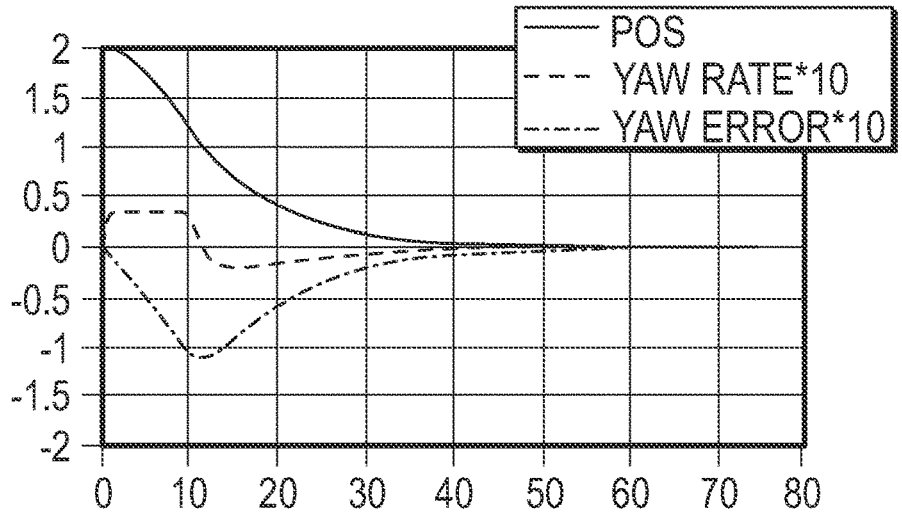

FIGS. 9A-9C illustrate plots of time verses XTE, TKE, and YRE that generated based on a simulated example of a steering controller steering an agricultural machine in a line acquire operation based on starting parameters of 2 meter (m) XTE, 0 degree (deg) TKE, and 3 meter per second (m/s) machine speed. The plot in FIG. 9A shows the agricultural machine steered in an AFS steering mode, the plot in FIG. 9B shows the agricultural machine steered in an 4WS steering mode, while the plot in FIG. 9C shows the agricultural machine steered in an AFRS steering mode. The depicted version of the AFRS mode includes a configuration where the front and rear axles of agricultural machine are always steered at fixed ratios (e.g., proportional steering) of to correct XTE and TKE when reducing vehicle swing. As shown in the plots, 4WS higher yaw error rates but shorter line acquire time. The AFRS mode with proportional steering (e.g., distributing 50% of the calculated output curve to each axle) has log YRE but suffers from long guidance line acquire time. XTE is plotted in black, yaw rate is scaled by 10 and plotted in cyan, and XTE is scaled by 10 and plotted in radians.

Figure 10A:
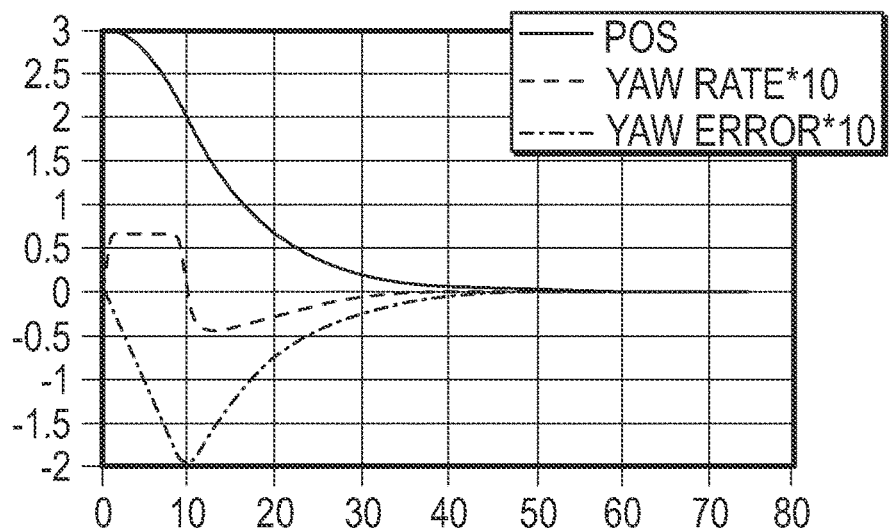
FIGS. 10A-10C illustrate plots of time verses XTE, TKE, and YRE that are generated based on a simulated example of a steering controller steering an agricultural machine in a line acquire operation.
Figure 10B:
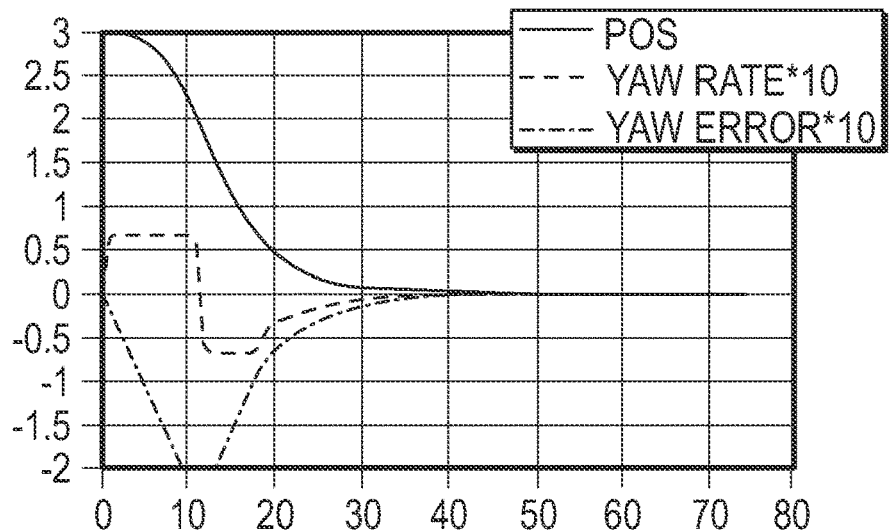
Figure 10C:
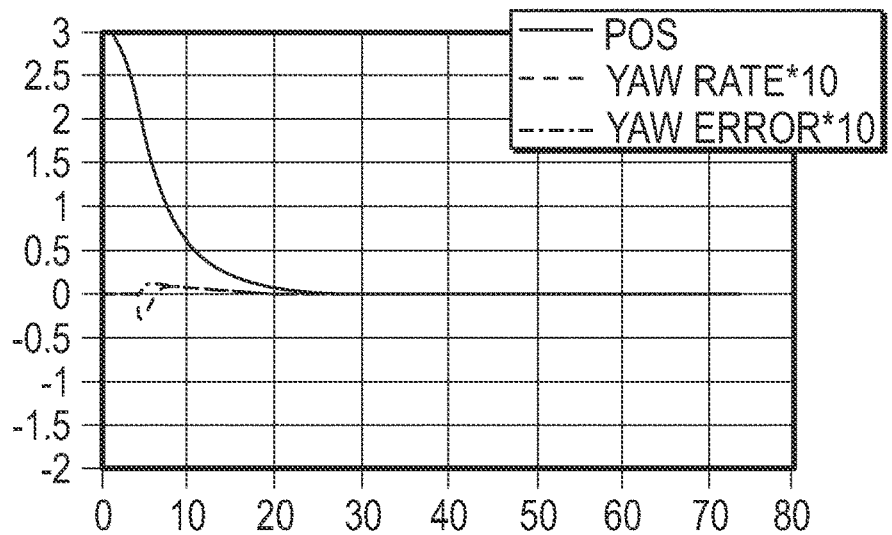

FIGS. 10A-10C illustrate plots of time verses XTE, TKE, and YRE that generated based on a simulated example of a steering controller steering an agricultural machine in a line acquire operation based on starting parameters of 3 meter (m) XTE, 0 degree (deg) TKE, and 3 meter per second (m/s) machine speed. The plot in FIG. 10A shows the agricultural machine steered in an AFS steering mode, the plot in FIG. 10B shows the agricultural machine steered in an 4WS steering mode, while the plot in FIG. 10C shows the agricultural machine steered in an AFRS steering mode. The depicted version of the AFRS mode includes a configuration where the front and rear axles of agricultural machine are steered such that position errors (e.g., XTE) result in a steering contribution to both axles while errors relating to machine orientation (e.g., TKE and YRE) are summed and distributed between the front and rear axles such that orientation errors result in a steering contribution to one axle (e.g., rotationalWeight=1), such as described herein. As shown in the plots, this AFRS configured of the steering controller reduces the time it takes to correct or adjust XTE, and rapidly reduces yaw rate and TKE.

Figure 11A:
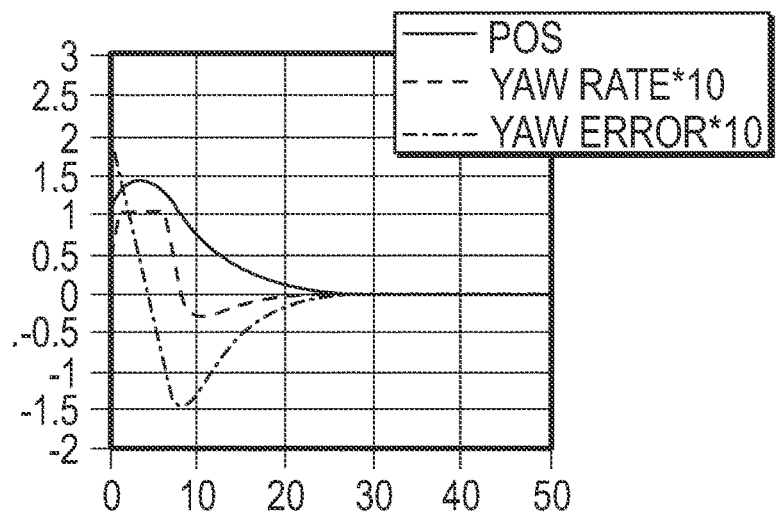
FIGS. 11A-11C illustrate plots of time verses XTE. TKE, and YRE that are generated based on a simulated example of a steering controller steering an agricultural machine in a line acquire operation.
Figure 11B:
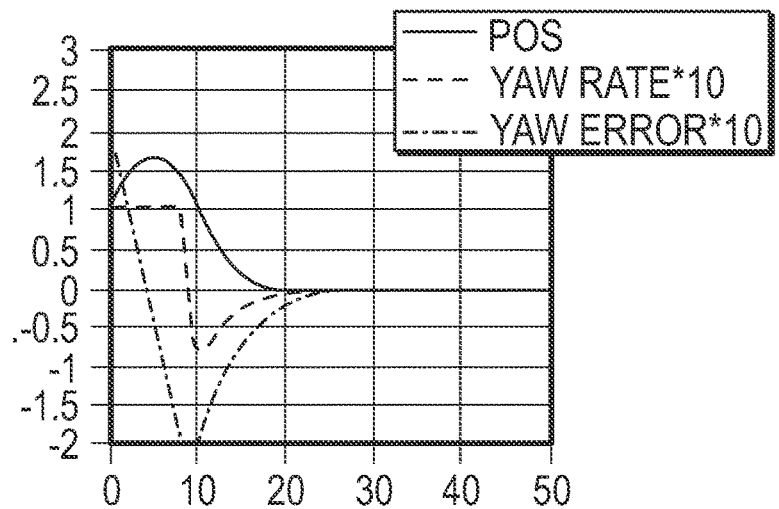
Figure 11C:
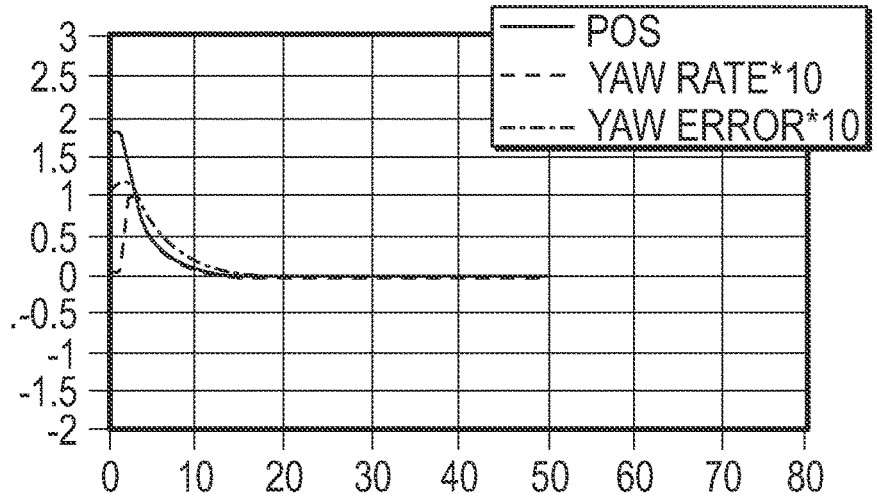

FIGS. 11A-11C illustrate plots of time verses XTE, TKE, and YRE that generated based on a simulated example of a steering controller steering an agricultural machine in a line acquire operation based on starting parameters of 1 m XTE, 10 deg TKE, and 2 m/s machine speed. The plot in FIG. 11A shows the agricultural machine steered in an AFS steering mode, the plot in FIG. 11B shows the agricultural machine steered in an 4WS steering mode, while the plot in FIG. 11C shows the agricultural machine steered in an AFRS steering mode. The depicted version of the AFRS mode includes the same configuration discussed in FIGS. 10A-10C. As shown in the plots, this AFRS configuration of the steering controller reduces the time it takes to correct or adjust XTE, and rapidly reduces yaw rate and TKE.

Figure 12A:
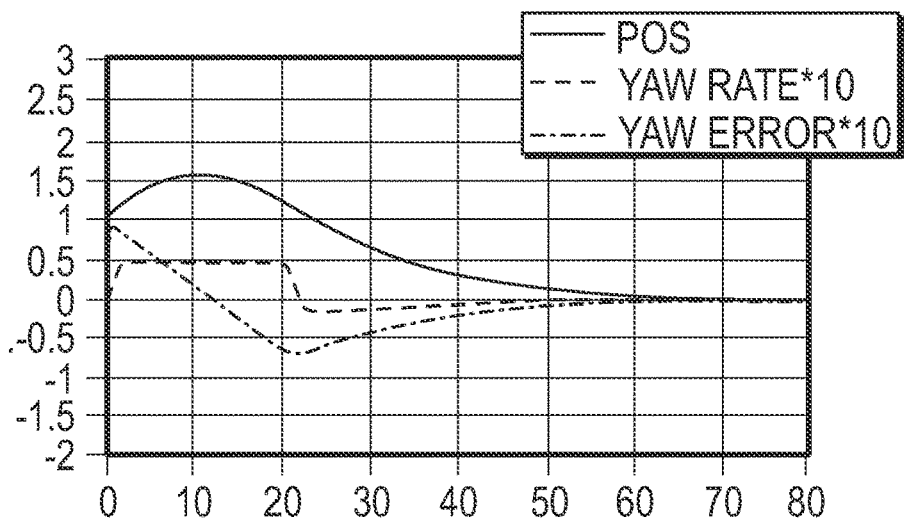
FIGS. 12A-12C illustrate plots of time verses XTE, TKE, and YRE that are generated based on a simulated example of a steering controller steering an agricultural machine in a line acquire operation.
Figure 12B:
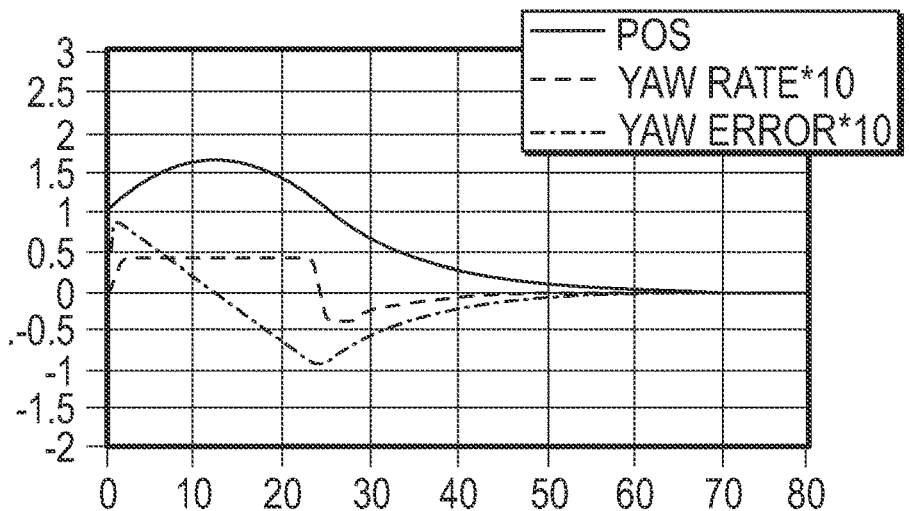
Figure 12C:
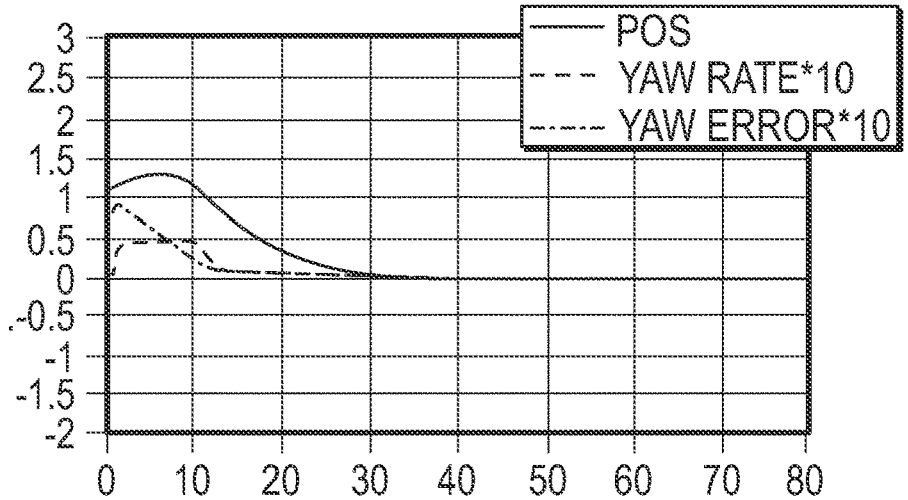

FIGS. 12A-12C illustrate plots of time verses XTE, TKE, and YRE that generated based on a simulated example of a steering controller steering an agricultural machine in a line acquire operation based on starting parameters of 1 m XTE, 5 deg TKE, and 5 m/s machine speed. The plot in FIG. 12A shows the agricultural machine steered in an AFS steering mode, the plot in FIG. 12B shows the agricultural machine steered in an 4WS steering mode, while the plot in FIG. 12C shows the agricultural machine steered in an AFRS steering mode. The depicted version of the AFRS mode includes the same configuration discussed in FIGS. 10A-10C. As shown in the plots, this AFRS configuration of the steering controller reduces the time it takes to correct or adjust XTE, and rapidly reduces yaw rate and TKE.

Figure 13A:
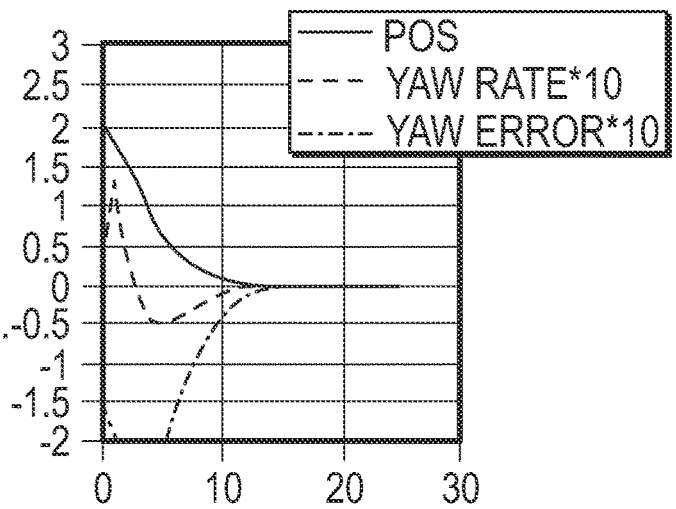
FIGS. 13A-13C illustrate plots of time verses XTE, TKE, and YRE that are generated based on a simulated example of a steering controller steering an agricultural machine in a line acquire operation.
Figure 13B:
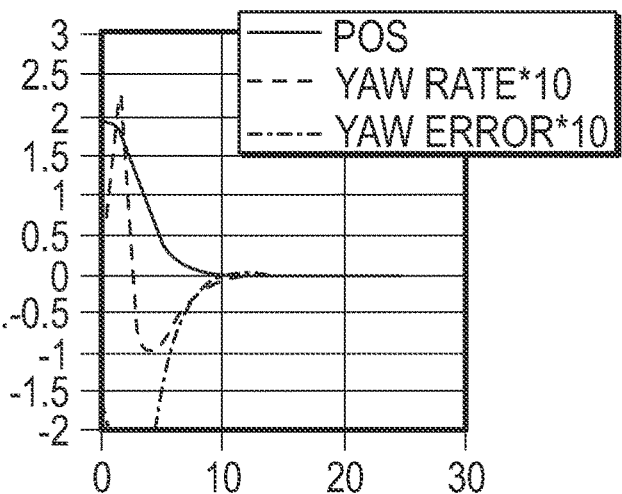
Figure 13C:
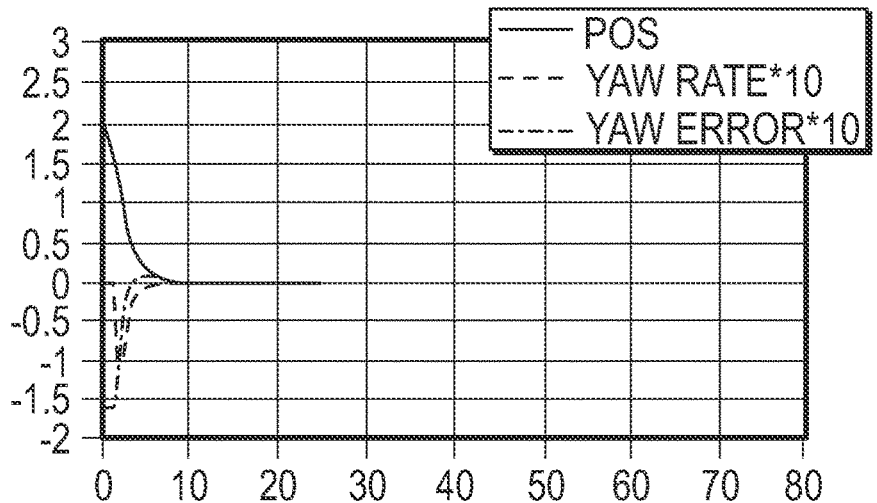

FIGS. 13A-13C illustrate plots of time verses XTE, TKE, and YRE that generated based on a simulated example of a steering controller steering an agricultural machine in a line acquire operation based on starting parameters of 1 m XTE, −10 deg TKE, and 1 m/s machine speed. The FIG. 13A shows the agricultural machine steered in an AFS steering mode, the FIG. 13B shows the agricultural machine steered in an 4WS steering mode, while the FIG. 13C shows the agricultural machine steered in an AFRS steering mode. The depicted version of the AFRS mode includes the same configuration discussed in FIGS. 10A-10C. As shown in the plots, this AFRS configuration of the steering controller reduces the time it takes to correct or adjust XTE, and rapidly reduces yaw rate and TKE.

Figure 14:
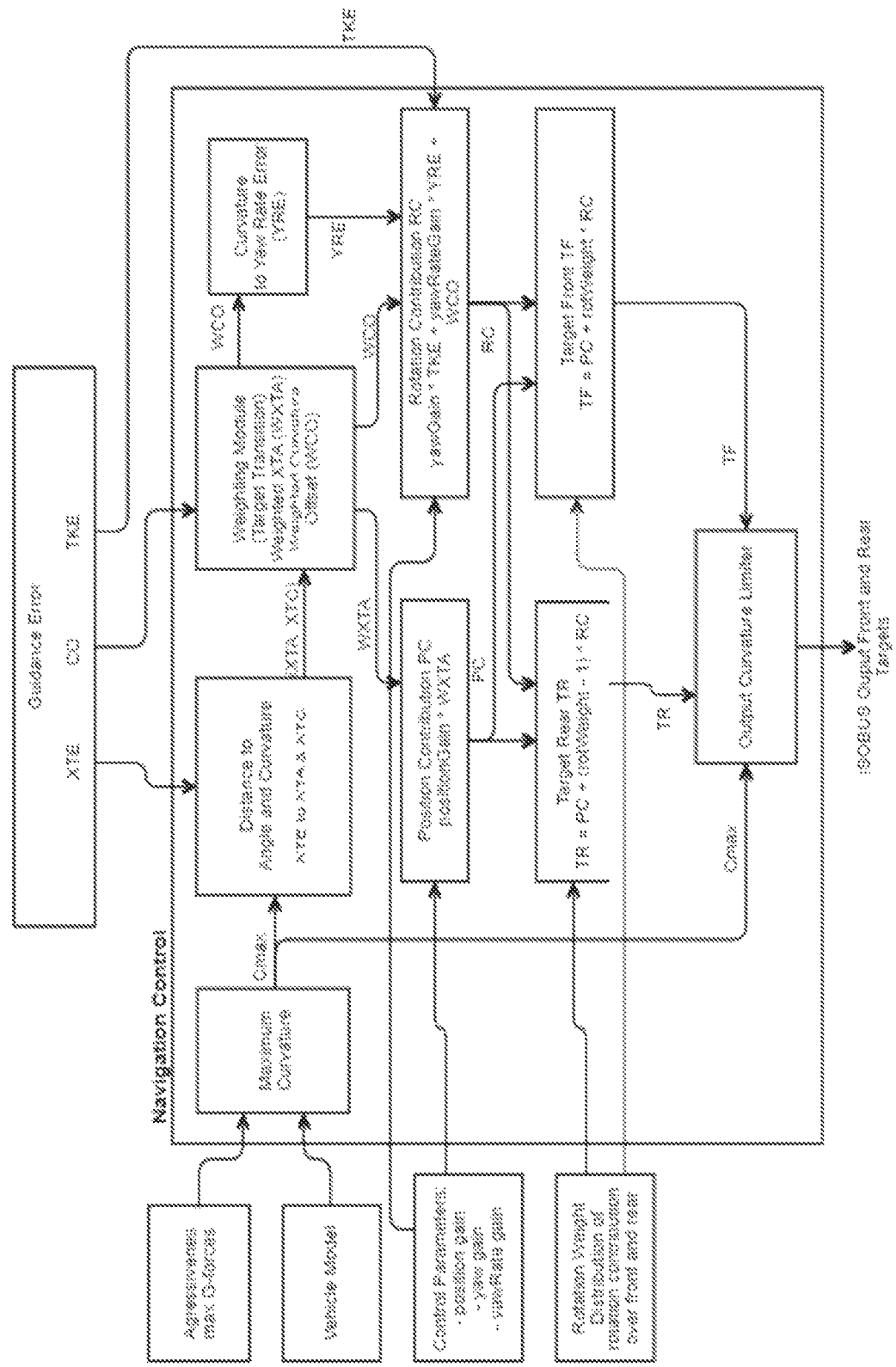
FIG. 14 illustrates an example of a navigation system for a machine.

FIG. 14 illustrates an example of a navigation system 1400 for a machine. The navigational control system 1400 is an example of the steering system 300 or the navigation system 700. As shown in FIG. 9, the navigation system 1400 includes is a more detailed example of one or more components of the navigation system 700 that are configured to implement the techniques of the present disclosure. As described herein, the navigation system 1400 can steer a machine in, or can dynamically switch between, an AFS, 4WS, or AFRS steering mode without the requiring individual turning sets or turning parameters for each mode. The navigation system 1400 is further configured to steer a machine to correct cross track errors and track-angle errors while reducing or limiting vehicle rotation. In an example, such steering includes automatically steering both a front and rear axle of a machine matching angles to correct an error in the machine's position. In another example, the steering includes automatically steering the front axle of the machine to correct an error in the yaw or rotation of the machine.

Figure 15:
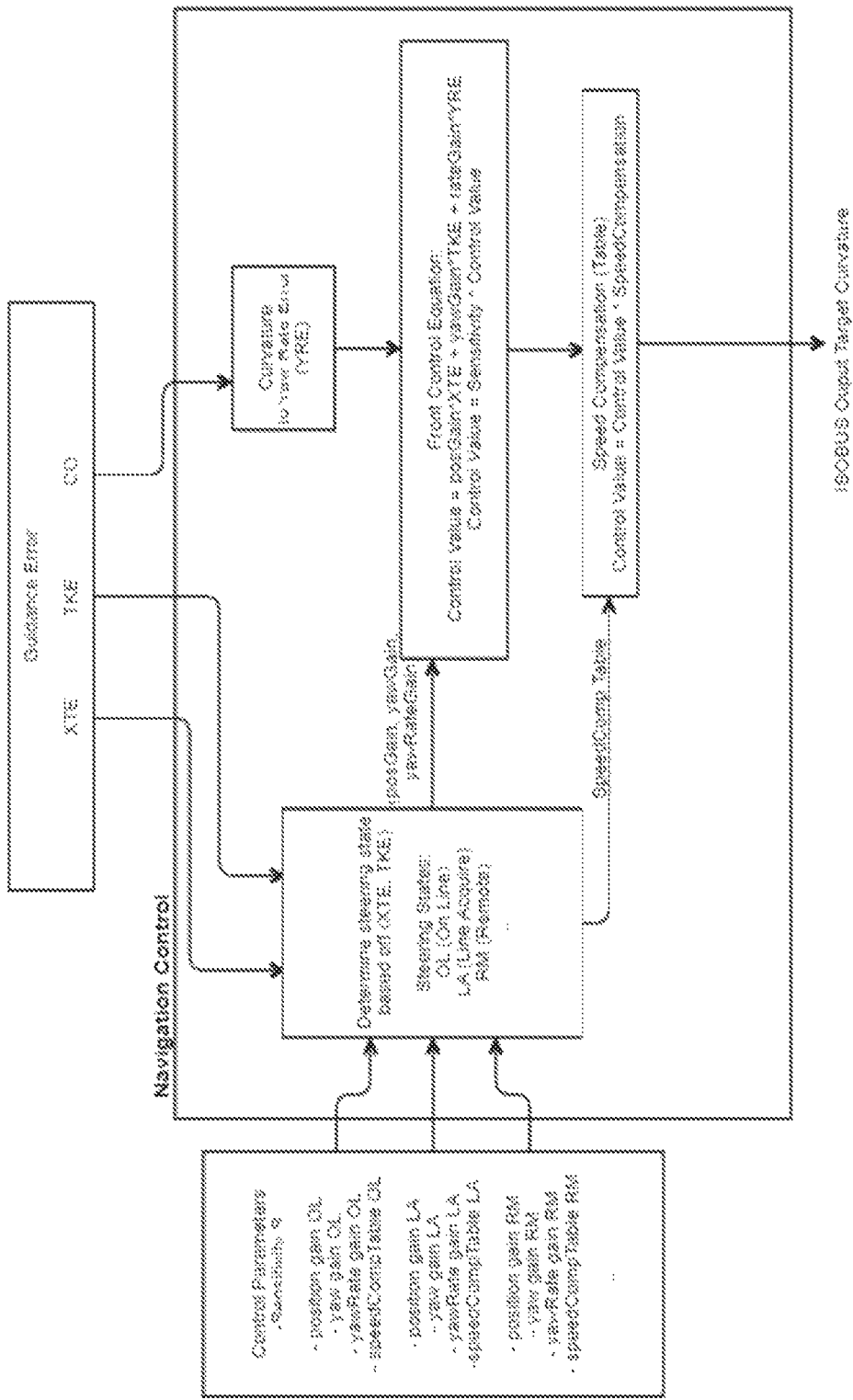
FIG. 15 illustrates an example of a navigation system that is configured to steer a machine according in an on-line, line acquire, or remote operation mode.

FIG. 15 illustrates an example of a navigation system 1500 that is configured to steer a machine according in an on-line, line acquire, or remote operation mode. The navigation system, however, may not be able to dynamically switch between each operating mode as such switching may require loading or incorporating distinct parameter or tuning sets into the controller model of the navigation system for each mode.

Figure 16:
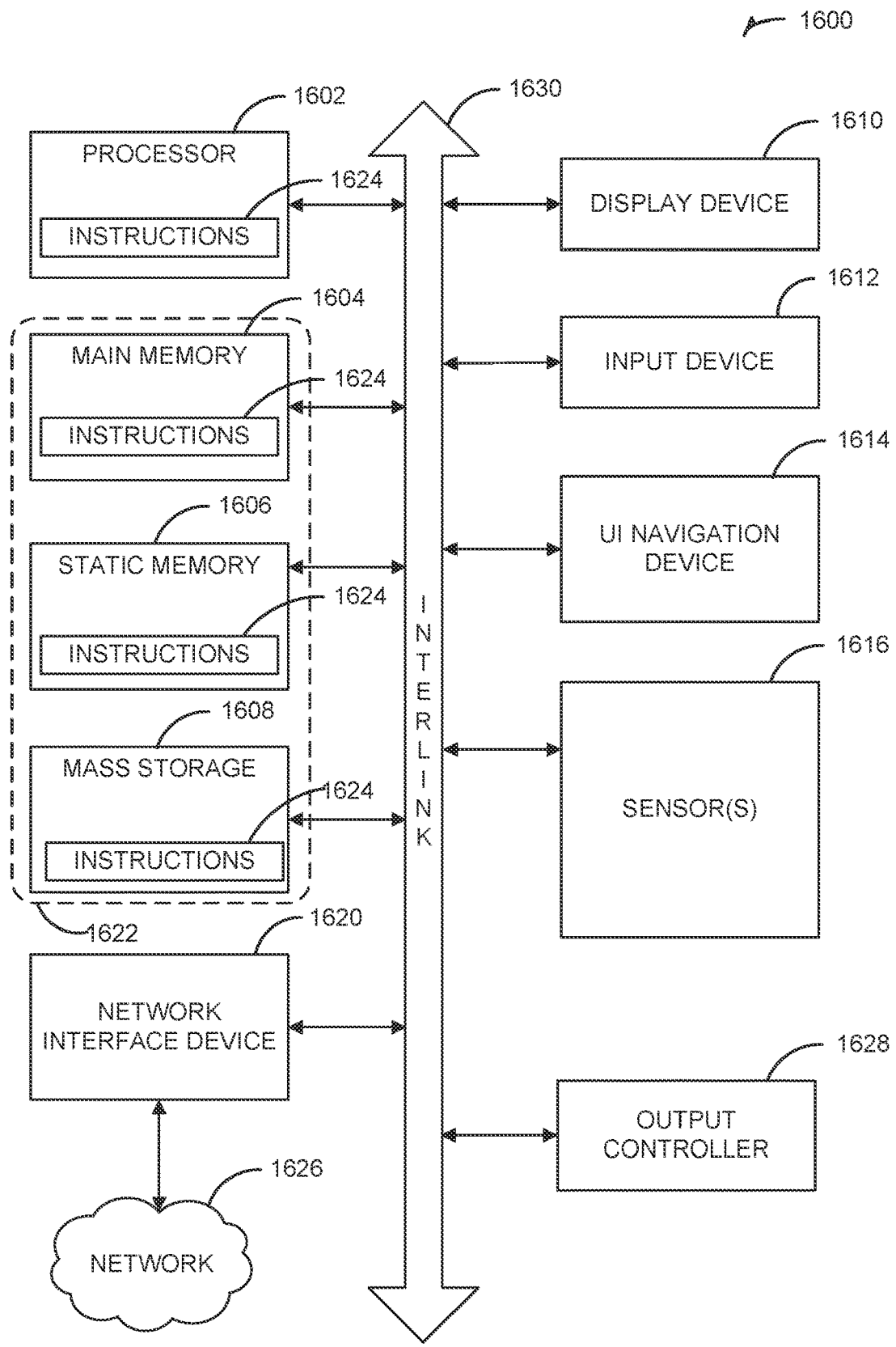
FIG. 16 illustrates a block diagram of an example machine upon which any one or more of the techniques (e.g., methodologies) discussed herein can perform.

FIG. 16 illustrates a block diagram of an example machine 1600 upon which any one or more of the techniques (e.g., methodologies) discussed herein can perform. Examples, as described herein, can include, or can operate by, logic or a number of components, or mechanisms in the machine 1600. Circuitry (e.g., processing circuitry) is a collection of circuits implemented in tangible entities of the machine 1600 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1600 follow.

In alternative embodiments, the machine 1600 can operate as a standalone device or can be connected (e.g., networked) to other machines. In a networked deployment, the machine 1600 can operate in the capacity of a server machine, a client machine, or both in server-client network environments. In an example, the machine 1600 can act as a peer machine in peer-to-peer (P2P) (or other distributed) network environment. The machine 1600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein (e.g., authenticating transmissions from machines in a job group, generating coverage maps and reports, relaying coverage data, capturing and conditioning sensor information, such as generated by the sensors 155 or 175, and generating guidance information to avoid double coverage of field being processed), such as cloud computing, software as a service (SaaS), other computer cluster configurations.

The machine (e.g., computer system) 1600 can include a hardware processor 1602 (e.g., a central processing unit (CPU), a graphics processing unit (GPU), a hardware processor core, or any combination thereof), a main memory 1604, a static memory (e.g., memory or storage for firmware, microcode, a basic-input-output (BIOS), unified extensible firmware interface (UEFI), etc.) 1606, and mass storage 1608 (e.g., hard drive, tape drive, flash storage, or other block devices) some or all of which can communicate with each other via an interlink (e.g., bus) 1630. The machine 1600 can further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 can be a touch screen display. The machine 1600 can additionally include a storage device (e.g., drive unit) 1608, a network interface device 1620, and one or more sensors 1616, such as a global positioning system (GPS) sensor, compass, accelerometer, or other sensor. The machine 1600 can include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1602, the main memory 1604, the static memory 1606, or the mass storage 1608 can be, or include, a machine readable medium 1622 on which is stored one or more sets of data structures or instructions 1624 (e.g., software) embodying or utilized by any one or more of the techniques or functions described herein. The instructions 1624 can also reside, completely or at least partially, within any of registers of the processor 1602, the main memory 1604, the static memory 1606, or the mass storage 1608 during execution thereof by the machine 1600. In an example, one or any combination of the hardware processor 1602, the main memory 1604, the static memory 1606, or the mass storage 1608 can constitute the machine readable media 1622. While the machine readable medium 1622 is illustrated as a single medium, the term "machine readable medium" can include a single medium or multiple media (e.g., a centralized or distributed database, and/or associated caches and servers) configured to store the one or more instructions 1624.

The term "machine readable medium" can include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 can be further transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 1620 can include one or more physical jacks (e.g., Ethernet, coaxial, or phone jacks) or one or more antennas to connect to the communications network 1626. In an example, the network interface device 1620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1600, and includes digital or analog communications signals or other intangible medium to facilitate communication of such software. A transmission medium is a machine readable medium.

Additional Notes & Examples

Example 1 is a device for steering an agricultural machine having independently steerable axles, the device comprising: a first steerable axle interface configured for coupling with a first steering mechanism of a first steerable axle; a second steerable axle interface configured for coupling with a second steering mechanism of a second steerable axle; a path planning module having at least one guidance path for the agricultural machine; and a steering control module configured to coordinate steering of at least the first and second steering mechanisms, the steering control module includes: a translational comparator configured to determine a translational difference between a location of the agricultural machine relative to the at least one guidance path; an angular comparator configured to determine an angular difference between an angular orientation of the agricultural machine relative to the at least one guidance path; a translation steering controller configured to actuate the first and second steering mechanisms according to the determined translational difference; and an angular steering controller configured to actuate the second steering mechanism according to the determined angular difference.

In Example 2, the subject matter of Example 1 includes, wherein the translational steering controller is configured to actuate the first and second steering mechanisms with matching angles in a crab steering mode.

In Example 3, the subject matter of Examples 1-2 includes, wherein the steering control module includes a transformation module configured to: determine a steering curve based on one or more of agricultural machine kinematics or agricultural machine speed; and convert the determined translational difference to a steering tangent including a tangent angle extending from the steering curve toward the at least one guidance path, wherein the determined translational difference is the steering tangent.

In Example 4, the subject matter of Example 3 includes, wherein the agricultural machine kinematics includes one or more of an indicated turning radius of the agricultural machine or a wheel base length of the agricultural machine.

In Example 5, the subject matter of Examples 3-4 includes, wherein an updated determined angular difference includes the tangent angle combined with the determined angular difference; and wherein the angular steering controller is configured to actuate the second steering mechanism according to the updated determined angular difference.

In Example 6, the subject matter of Example 5 includes, wherein the updated determined angular difference comprises a difference between a rate of change in the orientation of the agricultural machine and a target rate of change in the orientation of the agricultural machine.

In Example 7, the subject matter of Examples 5-6 includes, wherein the angular steering controller is configured to use a portion of the updated determined angular difference to actuate the first steering element to adjust the orientation of the agricultural machine based on the difference between the orientation of the agricultural machine and the orientation of the guidance path.

In Example 8, the subject matter of Example 7 includes, wherein the angular steering controller is configured to use a remaining portion of the updated determined angular difference to actuate the second steering element.

In Example 9, the subject matter of Examples 5-8 includes, wherein angular steering controller is configured to: use a first component of the updated determined angular difference to adjust an angular orientation of the first axle by a first angle; and use a second component of the updated determined angular difference to adjust an angular orientation of the second axle by a second angle, the first angle and the second angle having substantially equal magnitudes and opposed directions.

In Example 10, the subject matter of Examples 5-9 includes, wherein actuation of the first and second steering mechanisms guides the agricultural machine to the guidance path using a curved path determined by the curve based on the determined translational difference and one or more of the agricultural machine kinematics or agricultural machine speed, and the steering control module is configured to: obtain a curvature of the curve based on one or more of the agricultural machine kinematics the or agricultural machine speed; obtain an adjustment to the curvature based on a transition distance for transitioning the agricultural machine from the circular path to the guidance path, the transition distance measured from the agricultural machine traversing the curve to the guidance path; and adjust the first and second steering mechanisms based on the curvature and the adjustment to the curvature responsive to the transition distance.

In Example 11, the subject matter of Example 10 includes, wherein the steering control module is configured to determine the transition distance based on one or more of: the agricultural machine speed; the curvature; the difference between the orientation of the agricultural machine and the orientation of the guidance path; the agricultural machine kinematics; or an operator provided parameter.

Example 12 is a system for operating an agricultural machine, the system comprising: a steering control module configured to coordinate steering of one or more steering mechanisms of the agricultural machine to guide the agricultural machine on a curved path toward a target path, the steering control module includes: a translational comparator configured to determine a translational difference between a location of the agricultural machine and the target path; an angular comparator configured to determine an angular difference between an angular orientation of the agricultural machine and the target path; a vehicle operator interface configured to receive an operator input steering mode selection between at least first and second programmed steering modes; and a steering controller configured to actuate two or more steering mechanisms according to the first or second programmed steering modes: in the first programmed steering mode the steering controller is configured to determine a vehicle curvature adjustment based on the translational difference, the angular orientation, and one or more "shared vehicle model parameters", and distribute the vehicle curvature adjustment to the one or more steering mechanisms according to a steering apportionment associated with the first programmed steering mode; and in the second programed steering mode the steering controller is configured to distribute a vehicle curvature adjustment amongst the one or more steering mechanisms according to an apportionment determined by the second programmed steering mode without adjusting tuning parameters of the steering controller.

In Example 13, the subject matter of Example 12 includes, wherein the curvature adjustment is determined based on the curvature of the curved path, the speed of the agricultural machine, and at least one physical characteristic of the agricultural machine.

In Example 14, the subject matter of Examples 12-13 includes, wherein one or more steering mechanisms of the agricultural machine include at least first and second steering mechanisms, and the first programmed steering mode includes a four-wheel steering mode; and wherein in the four-wheel steering mode the steering controller is configured to actuate the first steering mechanism to turn to a first angle based on the vehicle curvature adjustment and to actuate the second steering mechanism to turn to a second angle based on the vehicle curvature adjustment; and wherein the second angle is oriented in an opposed direction to the first angle, and the magnitude of the first and second angles are based on the vehicle curvature adjustment and the shared vehicle model parameters.

In Example 15, the subject matter of Examples 12-14 includes, wherein one or more steering mechanisms of the agricultural machine include at least first and second steering mechanisms, and the first programmed steering mode includes a crab steering mode; and wherein in the crab steering mode the steering controller is configured to: actuate the first and second steering mechanism to turn to a first angle based on a translational component of the vehicle curvature adjustment, the translational component being determined at least partially based on the translational difference, and actuate the first and second steering mechanism to turn to respective second and third angles according to a rotational component of the curvature adjustment that is apportioned between the first and second steering mechanisms, the rotational component being determined based on the angular difference.

In Example 16, the subject matter of Example 15 includes, wherein the rotational component is at least partially determined based on the translational difference.

In Example 17, the subject matter of Examples 12-16 includes, wherein one or more steering mechanisms of the agricultural machine include at least a first steering mechanism, and the first programmed steering mode includes a two-wheel steering mode; and wherein in the two-wheel steering mode the steering controller is configured to actuate the first steering mechanism to turn to at an angle determined based on the vehicle curvature adjustment.

In Example 18, the subject matter of Examples 12-17 includes, wherein the shared tuning parameters are static between the first steering mode and the second steering mode.

Example 19 is a method of steering an agricultural machine having independently steerable axles, the method comprising: obtaining information that is indicative of a guidance path for the agricultural machine; determining a translational difference between a location of the agricultural machine relative to the at least one guidance path; determining an angular difference between an angular orientation of the agricultural machine relative to the at least one guidance path; actuating first and second steering mechanisms according to the determined translational difference, wherein the first steering mechanism is for steering a front part of the agricultural machine and the second steering mechanism is for steering a back part of the agricultural machine; and actuate the second steering mechanism according to the determined angular difference.

In Example 20, the subject matter of Example 19 includes, determining a steering curve based on one or more of agricultural machine kinematics or agricultural machine speed; and converting the determined translational difference to a steering tangent including a tangent angle extending from the steering curve toward the one guidance path.

In Example 21, the subject matter of Examples 19-20 includes, determining an updated determined angular difference based on the tangent angle and the determined angular difference; and actuating the second steering mechanism according to the updated determined angular difference.

In Example 22, the subject matter of Example 21 includes, determining the updated determined angular difference based on a difference between a rate of change in the orientation of the agricultural machine and a target rate of change in the orientation of the agricultural machine.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for steering an agricultural machine having independently steerable axles, the device comprising:
   a first steerable axle interface configured for electronic coupling with a first steering mechanism of a first steerable axle coupled with one or more first ground engaging elements;
   a second steerable axle interface configured for electronic coupling with a second steering mechanism of a second steerable axle coupled with one or more second ground engaging elements; and
   one or more processors configured to:
      include at least one guidance path for the agricultural machine;
      coordinate steering of at least the first and second steering mechanisms;
      determine a translational difference between a location of the agricultural machine relative to the at least one guidance path;
      determine an angular difference between an angular orientation of the agricultural machine relative to the at least one guidance path;
      determine a rotational contribution based on the angular difference;
      distribute a first portion of the rotational contribution to the first steering mechanism and distribute a second remainder portion of the rotational contribution to the second steering mechanism each according to a rotational weight, wherein the first portion of the rotational contribution is proportional to the rotational weight, and the second remainder portion of the rotational contribution is inversely proportional to the rotational weight;
      actuate the first and second steering mechanisms according to the determined translational difference to change steering angles of the one or more first and second ground engaging elements; and
      actuate one or both of the first or second steering mechanisms according to the respective first and second remainder portions of the rotational contribution to change the steering angle of one or more of the first or second ground engaging elements, in combination with the actuation of the first and second steering mechanism according to the determined translational difference.

2. The device of claim 1, wherein the translational steering controller is configured to actuate the first and second steering mechanisms with matching angles in a crab steering mode.

3. The device of claim 1, wherein the steering control module includes a transformation module configured to:
determine a steering curve based on one or more of agricultural machine kinematics or agricultural machine speed; and
convert the determined translational difference to a steering tangent including a tangent angle extending from the steering curve toward the at least one guidance path, wherein the determined translational difference is the steering tangent.

4. The device of claim 3, wherein the agricultural machine kinematics includes one or more of an indicated turning radius of the agricultural machine or a wheel base length of the agricultural machine.

5. The device of claim 3, wherein an updated determined angular difference includes the tangent angle combined with the determined angular difference; and
wherein the angular steering controller is configured to actuate the second steering mechanism according to the updated determined angular difference.

6. The device of claim 5, wherein the updated determined angular difference comprises a difference between a rate of change in the orientation of the agricultural machine and a target rate of change in the orientation of the agricultural machine.

7. The device of claim 5, wherein the angular steering controller is configured to use a portion of the updated determined angular difference to actuate the first steering element to adjust the orientation of the agricultural machine based on the difference between the orientation of the agricultural machine and the orientation of the guidance path.

8. The device of claim 7, wherein the angular steering controller is configured to use a remaining portion of the updated determined angular difference to actuate the second steering element.

9. The device of claim 5, wherein angular steering controller is configured to:
use a first component of the updated determined angular difference to adjust an angular orientation of the first axle by a first angle; and
use a second component of the updated determined angular difference to adjust an angular orientation of the second axle by a second angle, the first angle and the second angle having substantially equal magnitudes and opposed directions.

10. The device of claim 5, wherein actuation of the first and second steering mechanisms guides the agricultural machine to the guidance path using a curved path determined by the curve based on the determined translational difference and one or more of the agricultural machine kinematics or agricultural machine speed, and the steering control module is configured to:
obtain a curvature of the curve based on one or more of the agricultural machine kinematics the or agricultural machine speed;
obtain an adjustment to the curvature based on a transition distance for transitioning the agricultural machine from the circular path to the guidance path, the transition distance measured from the agricultural machine traversing the curve to the guidance path; and
adjust the first and second steering mechanisms based on the curvature and the adjustment to the curvature responsive to the transition distance.

11. The device of claim 10, wherein the steering control module is configured to determine the transition distance based on one or more of:
the agricultural machine speed;
the curvature;
the difference between the orientation of the agricultural machine and the orientation of the guidance path;
the agricultural machine kinematics; or
an operator provided parameter.

12. The device of claim 1, wherein the rotational weight includes values in a range extending between zero and one, including intermediate values therebetween.

13. The device of claim 1, wherein the rotational weight includes values of zero and one.

14. A method of steering an agricultural machine having independently steerable axles, the method comprising:
obtaining information that is indicative of a guidance path for the agricultural machine;
determining a translational difference between a location of the agricultural machine relative to the at least one guidance path;
determining an angular difference between an angular orientation of the agricultural machine relative to the at least one guidance path;
determine a rotational contribution according to the angular difference;
distribute a first portion of the rotational contribution to the first steering mechanism and distribute a second remainder portion of the rotational contribution to the second steering mechanism each according to a rotational weight, wherein the first portion of the rotational contribution is proportional to the rotational weight, and the second remainder portion of the rotational contribution is inversely proportional to the rotational weight;
actuating first and second steering mechanisms according to the determined translational difference to change steering angles of ground engaging elements coupled with the first and second steering mechanisms, wherein the first steering mechanism is for steering a front part of the agricultural machine and the second steering mechanism is for steering a back part of the agricultural machine; and
actuate one or both of the first or second steering mechanisms according to the respective first and second remainder portions of the rotational contribution to change the steering angle of the ground engaging elements coupled with one or more of the first or second steering mechanisms in combination with the actuation of the first and second steering mechanism according to the determined translational difference.

15. The method of claim 14, further comprising:
determining a steering curve based on one or more of agricultural machine kinematics or agricultural machine speed; and
converting the determined translational difference to a steering tangent including a tangent angle extending from the steering curve toward the one guidance path.

16. The method of claim 14, further comprising:
determining an updated determined angular difference based on the tangent angle and the determined angular difference; and actuating the second steering mechanism according to the updated determined angular difference.

17. The method of claim 16, further comprising determining the updated determined angular difference based on a difference between a rate of change in the orientation of the agricultural machine and a target rate of change in the orientation of the agricultural machine.

18. The method of claim 14, wherein the rotational weight includes values in a range extending between zero and one, including intermediate values therebetween.

19. The method of claim 14, wherein the rotational weight includes values of zero and one.

* * * * *